(12) United States Patent
Mukerjee et al.

(10) Patent No.: US 7,352,905 B2
(45) Date of Patent: Apr. 1, 2008

(54) CHROMA MOTION VECTOR DERIVATION

(75) Inventors: Kunal Mukerjee, Redmond, WA (US); Pohsiang Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 10/933,908

(22) Filed: Sep. 2, 2004

(65) Prior Publication Data

US 2005/0053294 A1 Mar. 10, 2005

Related U.S. Application Data

(60) Provisional application No. 60/501,081, filed on Sep. 7, 2003.

(51) Int. Cl.
*G06K 9/36* (2006.01)

(52) U.S. Cl. ...................................... 382/236

(58) Field of Classification Search ............... 382/236, 382/238, 248, 250; 375/240.16, 240.26, 375/240.28, 240.29, E7.093, E7.166, E7.211, 375/240.12, 240.13; 348/394.1, 395.1, 400.1–404.1, 348/407.1–416.1, 430.1, 431.1
See application file for complete search history.

(56) References Cited

U.S. PATENT DOCUMENTS

| | | | |
|---|---|---|---|
| 4,454,546 A | 6/1984 | Mori | |
| 4,661,849 A | 4/1987 | Hinman | |
| 4,661,853 A | 4/1987 | Roeder et al. | |
| 4,691,329 A | 9/1987 | Juri et al. | |
| 4,695,882 A | 9/1987 | Wada et al. | |
| 4,796,087 A | 1/1989 | Guichard et al. | |
| 4,800,432 A | 1/1989 | Barnett et al. | |
| 4,849,812 A | 7/1989 | Borgers et al. | |
| 4,862,267 A | 8/1989 | Gillard et al. | |
| 4,864,393 A | 9/1989 | Harradine et al. | |
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |

(Continued)

FOREIGN PATENT DOCUMENTS

EP      0 279 053      8/1988

(Continued)

OTHER PUBLICATIONS

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

(Continued)

*Primary Examiner*—Jose L. Couso
(74) *Attorney, Agent, or Firm*—Klarquist Sparkman, LLP

(57) ABSTRACT

A decoder receives luma motion vector information for plural luma motion vectors for a macroblock (e.g., a 4:2:0 macroblock). The decoder derives a chroma motion vector for each of the plural luma motion vectors by performing at least one calculation on the luma motion vector information, maintaining a 1:1 ratio of chroma motion vectors to luma motion vectors for the macroblock. For example, the decoder receives four luma (frame or field) motion vectors for a macroblock and derives four chroma motion vectors for the macroblock. The deriving can comprise sub-sampling and/or rounding (e.g., using a field-based rounding table).

22 Claims, 33 Drawing Sheets

Software 1880 implementing video encoder or decoder with described techniques and tools

U.S. PATENT DOCUMENTS

| | | |
|---|---|---|
| 5,103,306 A | 4/1992 | Weiman et al. |
| 5,111,292 A | 5/1992 | Kuriacose et al. |
| 5,117,287 A | 5/1992 | Koike et al. |
| 5,155,594 A | 10/1992 | Bernstein et al. |
| 5,157,490 A | 10/1992 | Kawai et al. |
| 5,175,618 A | 12/1992 | Ueda |
| 5,193,004 A | 3/1993 | Wang et al. |
| 5,223,949 A | 6/1993 | Honjo |
| 5,258,836 A | 11/1993 | Murata |
| 5,274,453 A | 12/1993 | Maeda |
| 5,287,420 A | 2/1994 | Barrett |
| 5,298,991 A | 3/1994 | Yagasaki et al. |
| 5,317,397 A | 5/1994 | Odaka et al. |
| 5,319,463 A | 6/1994 | Hongu et al. |
| 5,343,248 A | 8/1994 | Fujinami |
| 5,347,308 A | 9/1994 | Wai |
| 5,376,971 A | 12/1994 | Kadono et al. |
| 5,379,351 A | 1/1995 | Fandrianto et al. |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,422,676 A | 6/1995 | Herpel et al. |
| 5,424,779 A | 6/1995 | Odaka |
| 5,428,396 A | 6/1995 | Yagasaki |
| 5,442,400 A | 8/1995 | Sun |
| 5,448,297 A | 9/1995 | Alattar et al. |
| 5,453,799 A | 9/1995 | Yang et al. |
| 5,457,495 A | 10/1995 | Hartung |
| 5,461,421 A | 10/1995 | Moon |
| RE35,093 E | 11/1995 | Wang et al. |
| 5,465,118 A | 11/1995 | Hancock et al. |
| 5,467,086 A | 11/1995 | Jeong |
| 5,467,136 A | 11/1995 | Odaka |
| 5,477,272 A | 12/1995 | Zhang |
| RE35,158 E | 2/1996 | Sugiyama |
| 5,491,523 A | 2/1996 | Sato |
| 5,510,840 A | 4/1996 | Yonemitsu et al. |
| 5,517,327 A | 5/1996 | Nakatani et al. |
| 5,539,466 A | 7/1996 | Igarashi et al. |
| 5,544,286 A | 8/1996 | Laney |
| 5,546,129 A | 8/1996 | Lee |
| 5,550,541 A | 8/1996 | Todd |
| 5,552,832 A | 9/1996 | Astle |
| 5,565,922 A | 10/1996 | Krause |
| 5,594,504 A | 1/1997 | Ebrahimi |
| 5,594,813 A | 1/1997 | Fandrianto et al. |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,648,819 A | 7/1997 | Tranchard |
| 5,654,771 A | 8/1997 | Tekalp et al. |
| 5,659,365 A | 8/1997 | Wilkinson |
| 5,666,461 A | 9/1997 | Igarashi et al. |
| 5,668,608 A | 9/1997 | Lee |
| 5,668,932 A | 9/1997 | Laney |
| 5,687,097 A | 11/1997 | Mizusawa et al. |
| 5,689,306 A | 11/1997 | Jung |
| 5,692,063 A | 11/1997 | Lee et al. |
| 5,699,476 A | 12/1997 | Van Der Meer |
| 5,701,164 A | 12/1997 | Kato |
| 5,715,005 A | 2/1998 | Masaki |
| 5,717,441 A | 2/1998 | Serizawa et al. |
| 5,731,850 A | 3/1998 | Maturi et al. |
| 5,748,784 A | 5/1998 | Sugiyama |
| 5,748,789 A | 5/1998 | Lee et al. |
| 5,767,898 A | 6/1998 | Urano et al. |
| 5,784,175 A | 7/1998 | Lee |
| 5,786,860 A | 7/1998 | Kim et al. |
| 5,787,203 A | 7/1998 | Lee et al. |
| 5,793,897 A | 8/1998 | Jo et al. |
| 5,796,855 A | 8/1998 | Lee |
| 5,799,113 A | 8/1998 | Lee |
| RE35,910 E | 9/1998 | Nagata et al. |
| 5,825,830 A | 10/1998 | Kopf |
| 5,825,929 A | 10/1998 | Chen et al. |
| 5,835,144 A | 11/1998 | Matsumura et al. |
| 5,835,149 A | 11/1998 | Astle |
| 5,844,613 A | 12/1998 | Chaddha |
| 5,847,776 A | 12/1998 | Khmelnitsky |
| 5,874,995 A | 2/1999 | Naimpally |
| 5,901,248 A | 5/1999 | Fandrianto et al. |
| 5,923,375 A | 7/1999 | Pau |
| 5,929,940 A | 7/1999 | Jeannin |
| 5,946,042 A | 8/1999 | Kato |
| 5,946,043 A | 8/1999 | Lee et al. |
| 5,949,489 A | 9/1999 | Nishikawa et al. |
| 5,959,673 A | 9/1999 | Lee |
| 5,963,258 A | 10/1999 | Nishikawa et al. |
| 5,963,259 A | 10/1999 | Nakaya et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,982,437 A | 11/1999 | Okazaki et al. |
| 5,982,438 A | 11/1999 | Lin et al. |
| 5,990,960 A | 11/1999 | Murakami et al. |
| 5,991,447 A * | 11/1999 | Eifrig et al. ................ 382/236 |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl |
| 6,026,195 A | 2/2000 | Eifrig et al. |
| 6,035,070 A | 3/2000 | Moon et al. |
| 6,040,863 A | 3/2000 | Kato |
| 6,052,150 A | 4/2000 | Kikuchi |
| 6,058,212 A | 5/2000 | Yokohama |
| 6,067,322 A | 5/2000 | Wang |
| 6,094,225 A | 7/2000 | Han |
| RE36,822 E | 8/2000 | Sugiyama |
| 6,097,759 A | 8/2000 | Murakami et al. |
| 6,111,914 A | 8/2000 | Bist |
| 6,130,963 A | 10/2000 | Uz et al. |
| 6,148,027 A | 11/2000 | Song et al. |
| 6,148,033 A | 11/2000 | Pearlstein et al. |
| 6,154,495 A | 11/2000 | Yamaguchi et al. |
| 6,188,725 B1 | 2/2001 | Sugiyama |
| 6,188,794 B1 | 2/2001 | Nishikawa et al. |
| 6,201,927 B1 | 3/2001 | Comer |
| 6,205,176 B1 | 3/2001 | Sugiyama |
| 6,208,761 B1 | 3/2001 | Passagio et al. |
| 6,215,905 B1 | 4/2001 | Lee et al. |
| 6,219,070 B1 | 4/2001 | Baker et al. |
| 6,219,464 B1 | 4/2001 | Greggain et al. |
| 6,233,017 B1 | 5/2001 | Chaddha |
| RE37,222 E | 6/2001 | Yonemitsu |
| 6,243,418 B1 | 6/2001 | Kim |
| 6,259,741 B1 * | 7/2001 | Chen et al. ............ 375/240.26 |
| 6,263,024 B1 | 7/2001 | Matsumoto |
| 6,266,091 B1 * | 7/2001 | Saha et al. ............. 375/240.16 |
| 6,271,885 B2 | 8/2001 | Sugiyama |
| 6,275,531 B1 | 8/2001 | Li |
| 6,281,942 B1 | 8/2001 | Wang |
| 6,282,243 B1 | 8/2001 | Kazui et al. |
| 6,289,049 B1 | 9/2001 | Kim et al. |
| 6,292,585 B1 | 9/2001 | Yamaguchi et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,310,918 B1 * | 10/2001 | Saha et al. ............. 375/240.16 |

| | | | |
|---|---|---|---|
| 6,320,593 | B1 | 11/2001 | Sobel et al. |
| 6,324,216 | B1 | 11/2001 | Igarashi |
| 6,337,881 | B1 | 1/2002 | Chaddha |
| 6,339,656 | B1 | 1/2002 | Marui |
| 6,377,628 | B1 | 4/2002 | Schultz et al. |
| 6,381,279 | B1 | 4/2002 | Taubman |
| 6,396,876 | B1 | 5/2002 | Babonneau et al. |
| 6,404,813 | B1 | 6/2002 | Haskell et al. |
| 6,418,166 | B1 | 7/2002 | Wu et al. |
| 6,430,316 | B1 | 8/2002 | Wilkinson |
| 6,441,842 | B1 | 8/2002 | Fandrianto et al. |
| 6,496,608 | B1 | 12/2002 | Chui |
| 6,529,632 | B1 | 3/2003 | Nakaya et al. |
| 6,539,056 | B1 | 3/2003 | Sato et al. |
| 6,563,953 | B2 | 5/2003 | Lin et al. |
| 6,647,061 | B1 | 11/2003 | Panusopone et al. |
| 6,650,781 | B2 | 11/2003 | Nakaya |
| 6,661,470 | B1 | 12/2003 | Kawakami et al. |
| 6,728,317 | B1 | 4/2004 | Demos |
| RE38,563 | E * | 8/2004 | Eifrig et al. ............... 382/236 |
| 6,950,469 | B2 | 9/2005 | Karczewicz et al. |
| 6,968,008 | B1 | 11/2005 | Ribas-Corbera et al. |
| 6,983,018 | B1 | 1/2006 | Lin et al. |
| 7,023,919 | B2 | 4/2006 | Cho et al. |
| 2001/0050957 | A1 | 12/2001 | Nakaya et al. |
| 2002/0186890 | A1 | 12/2002 | Lee et al. |
| 2003/0095603 | A1 | 5/2003 | Lan et al. |
| 2003/0099292 | A1 | 5/2003 | Wang et al. |
| 2003/0112864 | A1 | 6/2003 | Karczewicz et al. |
| 2003/0113026 | A1 | 6/2003 | Srinivasan et al. |
| 2003/0142748 | A1 | 7/2003 | Tourapis |
| 2003/0152146 | A1 | 8/2003 | Lin et al. |
| 2003/0156646 | A1 | 8/2003 | Hsu et al. |
| 2003/0202705 | A1 | 10/2003 | Sun |
| 2005/0013497 | A1 | 1/2005 | Hsu et al. |
| 2005/0013498 | A1 | 1/2005 | Srinivasan |
| 2005/0036700 | A1 | 2/2005 | Lan et al. |
| 2005/0036759 | A1 | 2/2005 | Lin et al. |
| 2005/0100093 | A1 | 5/2005 | Holcomb |
| 2005/0226335 | A1 | 10/2005 | Lee et al. |
| 2006/0013307 | A1 | 1/2006 | Olivier et al. |

FOREIGN PATENT DOCUMENTS

| | | |
|---|---|---|
| EP | 0 397 402 | 11/1990 |
| EP | 0 526 163 | 2/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 884 912 | 12/1998 |
| EP | 0 944 245 | 9/1999 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 295 | 3/1994 |
| JP | 6 078 298 | 3/1994 |
| JP | 06-276481 | 9/1994 |
| JP | 06-276511 | 9/1994 |
| JP | 6292188 | 10/1994 |
| JP | 7-274171 | 10/1995 |
| JP | 08-140099 | 5/1996 |
| JP | 09-322163 | 12/1997 |
| JP | 10 056 644 | 2/1998 |
| WO | WO 00/33581 | 8/2000 |
| WO | WO 03/026296 | 3/2003 |

OTHER PUBLICATIONS

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audio-visual Services at $p{\times}64$ kbits," 28 pp. (1993).

ITU-T, "ITU-T Recommendation H.262: Information Technology—Generic Coding of Moving Pictures and Associated Audio Information: Videol," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbits/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

U.S. Appl. No. 60/341,674, filed Dec. 17, 2001, Lee et al.

U.S. Appl. No. 60/488,710, filed Jul. 18, 2003, Srinivasan et al.

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

Reader, "History of MPEG Video Compression—Ver. 4.0," 99 pp., document marked Dec. 16, 2003.

Printouts of FTP directories from http://ftp3.itu.ch , 8pp. (downloaded from the World Wide Web on Sep. 20, 2005.).

U.S. Appl. No. 60/501,133, filed Sep. 7. 2003, Holcomb et al.

U.S. Appl. No. 60/501,081, filed Sep. 7. 2003, Srinivasan et al.

Bartkowiak et al., "Color Video Compression Based on Chrominance Vector Quantization," 7th Int'l Workshop on Systems, Signals and Image Processing, IWSSIP 2000, Maribor 7-9 VI, pp. 107-110 (2000).

Benzler et al., "Improving multiresolution motion compensating hybrid coding by drift reduction," Picture Coding Symposium, 4 pp. (1996).

Benzler et al., "Motion and aliasing compensating prediction with quarter-pel accuracy and adaptive overlapping blocks as proposal for MPEG-4 tool evaluation—Technical desciption," ISO/IEC JTC1/SC29/WG11, MPEG 95/0552, 5 pp. (document marked 1995).

Benzler, "Results of core experiments P8 (Motion and Aliasing Compensating Prediction)," ISO/IEC JTC1/SC29/WG11, MPEG 97/2625, 8 pp. (document marked 1997).

Borman et al., "Block-matching Sub-pixel Motion Estimation from Noisy, Under-Sampled Frames—an Empirical Performance Evaluation," SPIE Visual Comm. & Image Processing, 10 pp. (1999).

Conklin et al., "Multi-resolution Motion Estimation," Proc. ICASPP '97, Munich, Germany, 4 pp. (1997).

Davis et al., "Equivalence of subpixel motion estimators based on optical flow and block matching," Proc. IEEE Int'l Symposium on Computer Vision, pp. 7-12 (1995).

de Haan et al., "Sub-pixel motion estimation with 3-D recursive search block-matching," Signal Processing: Image Comm.6, pp. 229-239 (1994).

"DivX Multi Standard Video Encoder," 2 pp. (Downloaded from the World Wide Web on Jan. 24, 2006).

Ericsson, "Fixed and Adaptive Predictors for Hybrid Predictive/Transform Coding," IEEE Transactions on Comm., vol. COM-33, No. 12, pp. 1291-1302 (1985).

Flierl et al., "Multihypothesis Motion Estimation for Video Coding," Proc. DCC, 10 pp. (Mar. 2001).

Fogg, "Survey of Software and Hardware VLC Architectures," SPIE, vol. 2186, pp. 29-37 (no date of publication).

Girod, "Efficiency Analysis of Multihypothesis Motion-Compensated Prediction for Video Coding," IEEE Transactions on Image Processing, vol. 9, No. 2, pp. 173-183 (Feb. 2000).

Girod, "Motion-Compensating Prediction with Fractional-Pel Accuracy," IEEE Transactions on Comm., vol. 41, No. 4, pp. 604-612 (1993).

Girod, "Motion Compensation: Visual Aspects, Accuracy, and Fundamental Limits," Motion Analysis and Image Squence Processing, Kluwer Academic Publishers, pp. 125-152 (1993).

Horn et al., "Estimation of Motion Vector Fields for Multiscale Motion Compensation," Proc. Picture Coding Symp. (PCS 97), pp. 141-144 (Sep. 1997).

Hsu et al., "A Low Bit-Rate Video Codec Based on Two-Dimensional Mesh Motion Compensation with Adaptive Interpolation," IEEE Transactions on Circuits and Systems for Video Technology, vol. II, No. 1, pp.111-117 (Jan. 2001).

IBM Technical Disclosure Bulletin, "Advanced Motion Estimation for Moving Picture Expert Gruop Encoders," vol. 39, No. 4, pp. 323-324 (Apr. 1996).

ISO/IEC, "MPEG-4 Video Verification Model Version 10.0," ISO/IEC JTC1/SC29/WG11, MPEG98/N1992, (ed. Ebrahimi) (document marked Feb. 1998).

ITU—Q15-F-24, "MVC Video Codec—Proposal for H.26L," Study Group 16, Video Coding Experts Group (Question 15), 28 pp. (document marked as generated in 1998).

Iwahashi et al., "A Motion Compensation Technique for Downscaled Pictures in Layered Coding," IEICE Transactions on Comm., vol. E77-B, No. 8, pp. 1007-1012 (Aug. 1994).

Jeong et al., "Adaptive Huffman Coding of 2-D DCT Coefficients for Image Sequence Compression," Signal Processing: Image Communication, vol. 7, 11 pp. (1995).

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Keys, "Cubic Convolution Interpolation for Digital Image Processing," IEEE Transactions on Acoustics, Speech & Signal Processing, vol. ASSP-29, No. 6, pp. 1153-1160 (1981).

Konrad et al., "On Motion Modeling and Estimation for Very Low Bit Rate Video Coding," Visual Comm. & Image Processing (VCIP '95), 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lopes et al., "Analysis of Spatical Transform Motion Estimation with Overlapped Compensation and Fractional-pixel Accuracy," IEEE Proc. Visual Image Signal Processing, vol. 146, No. 6, pp. 339-344 (Dec. 1999).

Morimoto et al., "Fast Electronic Digital Image Stabilization," Proc. ICPR, Vienna, Austria, 5 pp. (1996).

"Overview of MPEG-2 Test Model 5," 5 pp. [Downloaded from the World Wide Web on Mar. 1, 2006].

Ribas-Corbera et al., "On the Optimal Block Size for Block-based Motion-Compensated Video Coders," SPIE Proc. of Visual Comm. & Image Processing, vol. 3024, 12 pp. (1997).

Ribas-Corbera et al., "On the Optimal Motion Vector Accuracy for Block-based Motion-Compensated Video Coders," Proc. SPIE Digital Video Compression, San Jose, CA, 13 pp. (1996).

Schultz et al., "Subpixel Motion Estimation for Super-Resolution Image Sequence Enhancement," Journal of Visual Comm. & Image Representation, vol. 9, No. 1, pp. 38-50 (Mar. 1998).

Sullivan et al., "The H.264/AVC Advanced Video Coding Standard: Overview and Introduction to the Fidelity Range Extensions," 21 pp. (Aug. 2004).

"The TML Project WEB-Page and Archive," (including pages of code marked "image.cpp for H.26L decoder, Copyright 1999" and "image.c"), 24 pp. [Downloaded from the World Wide Web on Jun. 1, 2005].

Triggs, "Empirical Filter Estimation fro Subpixel Interpolation and Matching," Int'l Conf. Computer Vision '01, Vancouver, Canada, 8 pp. (Jul. 2001).

Triggs, "Optimal Filters for Subpixel Interpolation and Matching," Int'l Conf. Computer Vision '01, Vancouver, Canada, 10 pp. (Jul. 2001).

"Video Coding Using Wavelet Decomposition for Very Low Bit-Rate Networks," 16 pp. (1997).

Wang et al., "Interlace Coding Tools for H.26L Video Coding," ITU-T SG16/Q.6 VCEG-O37, pp. 1-20 (Dec. 2001).

Weiss et al., "Real Time Implementation of Subpixel Motion Estimation for Broadcast Applications," pp. 7/1-7/3 (1990).

Wiegand et al., "Long-term Memory Motion Compensated Prediction," IEEE Transactions on Circuits & Systems for Video Technology, vol. 9, No. 1, pp. 70-84 (Feb. 1999).

Wiegand, "Joint Model No. 1, Revision 1 (JM1-r1)," JVT-A003R1, Pattaya, Thailand, 80 pp. (Dec. 2001) [document marked "Generated: Jan. 18, 2002"].

Wien, "Variable Block-Size Transforms for Hybrid Video Coding," Dissertation, 182 pp. (Feb. 2004).

Wu et al., "Joint estimation of forward and backward motion vectors for interpolative prediction of video," IEEE Transactions on Image Processing, vol. 3, No. 5, pp. 684-687 (Sep. 1994).

Yang et al., "Very High Efficiency VLSI Chip-pair for Full Search Block Matching with Fractional Precision," Proc. ICASSP/IEEE Int'l Conf. on Acoustics, Speech & Signal Processing, Glasgow, pp. 2437-2440 (May 1989).

Zhang et al., "Adaptive Field/Frame Selection for High Compression Coding," MERL TR-2003-29, 13 pp. (Jan. 2003).

ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).

Patel et al., "Performance of a Software MPEG Video Decoder," *Proc. Of the First ACM Intl Conf on Multimedia*, pp. 75-82 (1993).

Wedi, "Complexity Reduced Motion Compensated Prediction with 1/8-pel Displacement Vector Resolution," ITU Study Group 16, Video Coding Experts Group (Question 6), Document VCEG-L20, 8 pp. (Document dated Dec. 2000).

Zhu, "RTP Payload Format for H.263 Video Streams," *IETF Request for Comments 2190*, 12 pp. (Sep. 1997).

\* cited by examiner

Figure 1, prior art
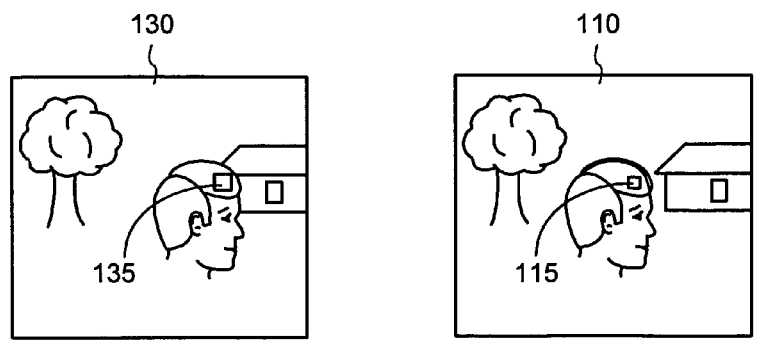
Figure 4, prior art
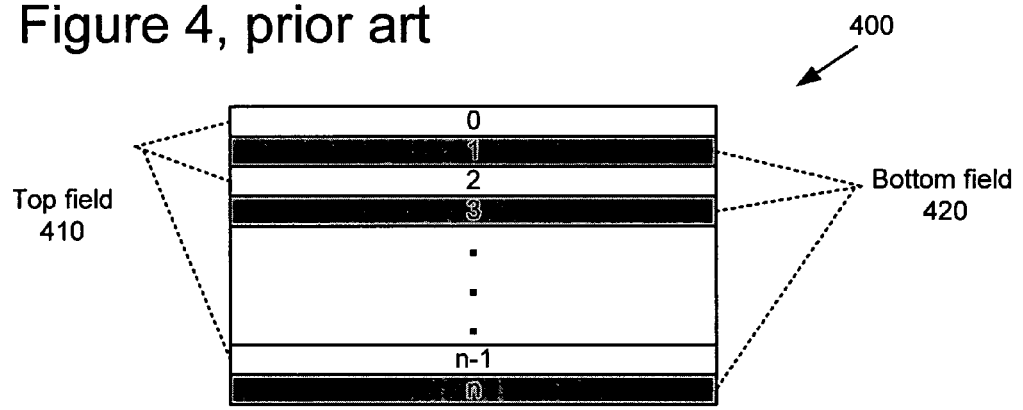

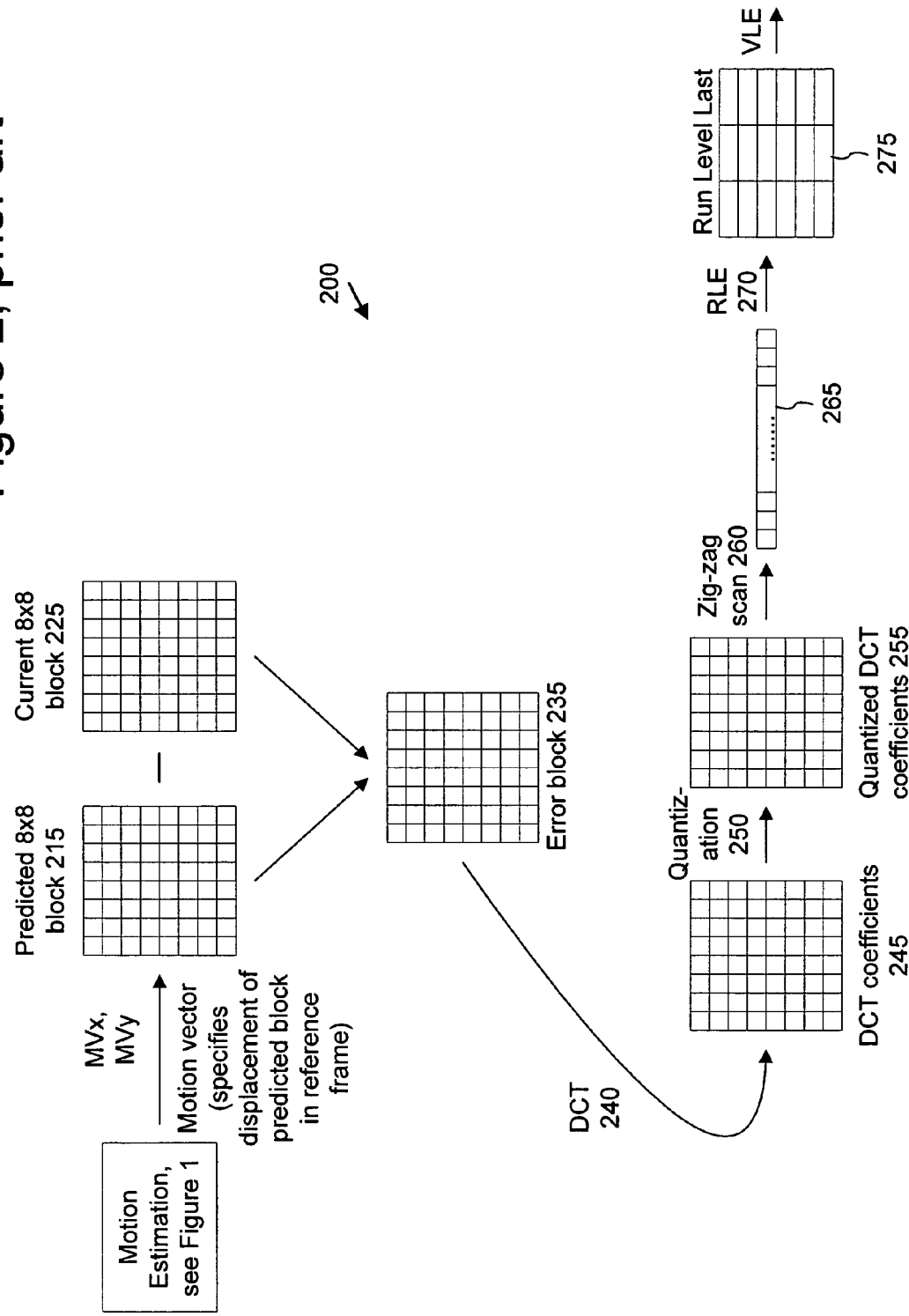
Figure 2, prior art

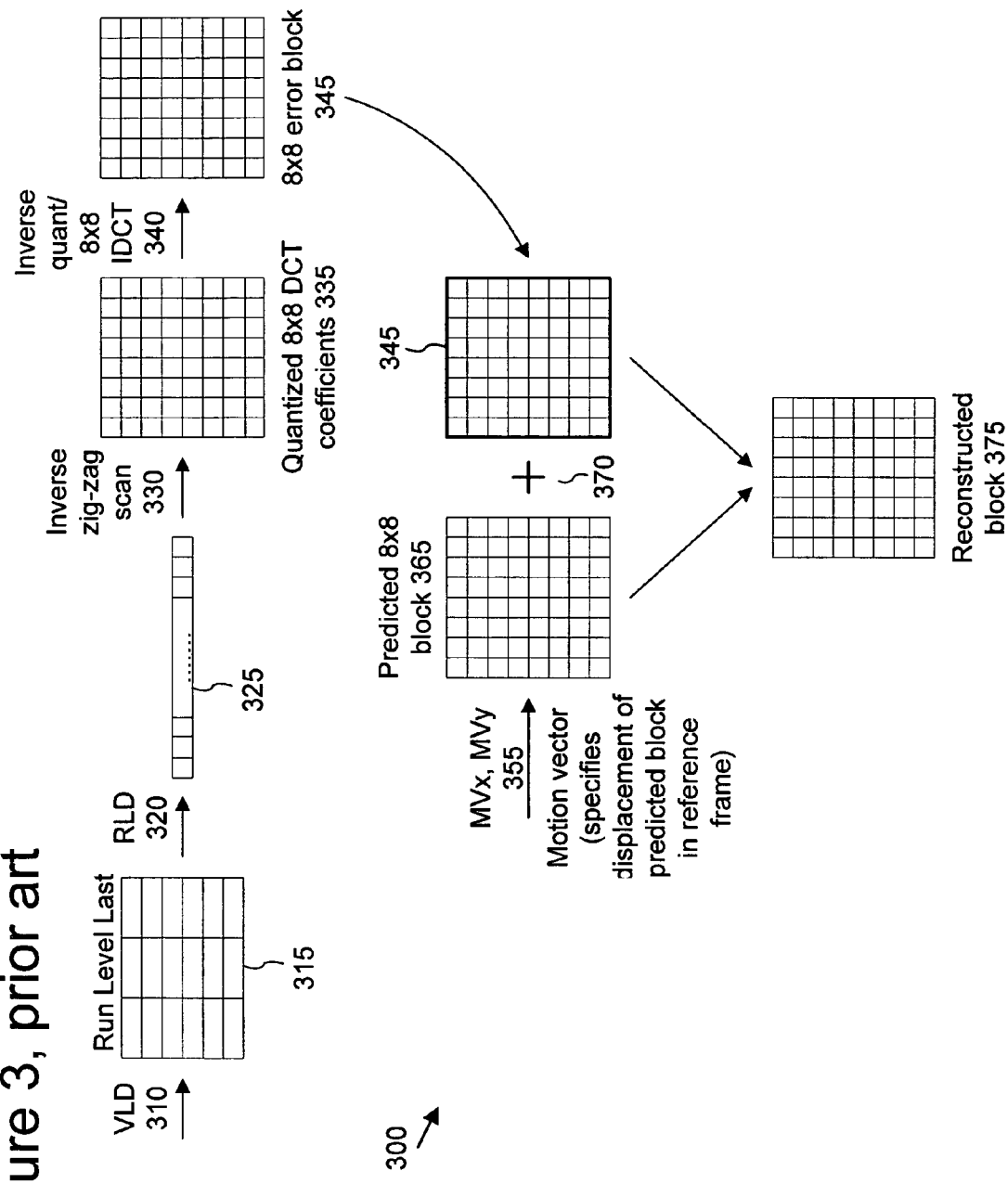
Figure 3, prior art

Figure 5A,
prior art
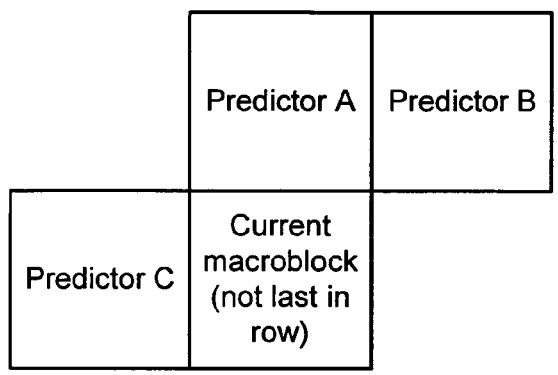
Figure 5B,
prior art
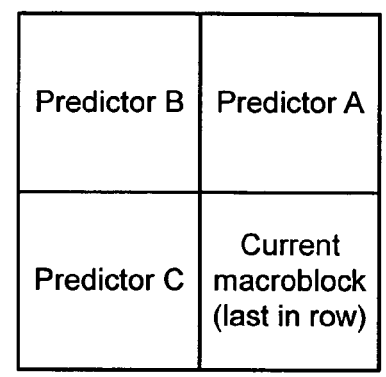
Figure 6A,
prior art
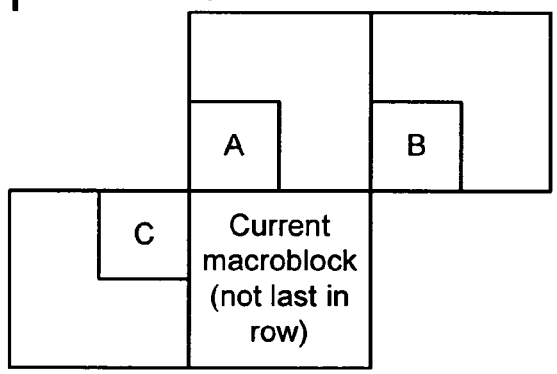
Figure 6B,
prior art
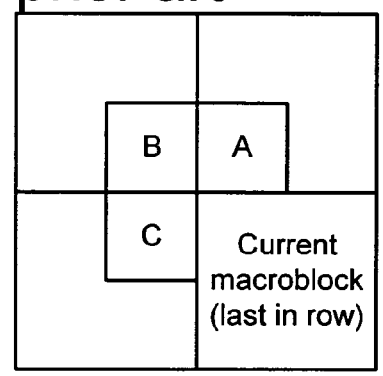

Figure 7A, prior art
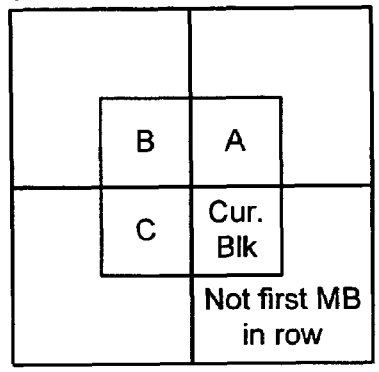
Figure 7B, prior art
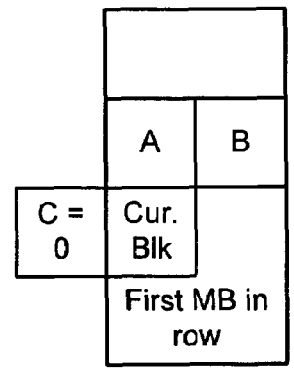
Figure 8A, prior art
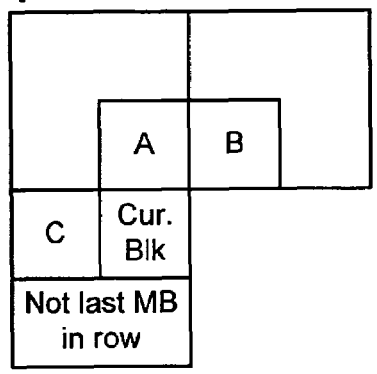
Figure 8B, prior art
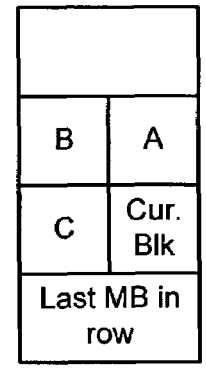
Figure 9, prior art
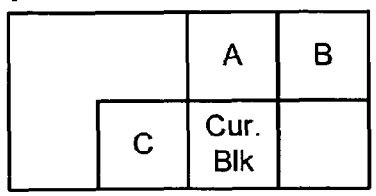
Figure 10, prior art
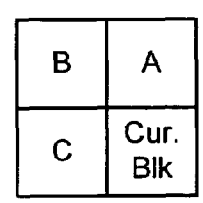

Figure 11, prior art

| Predictor A (compute average if field-coded) | Predictor B (compute average if field-coded) |
|---|---|
| Predictor C (compute average if field-coded) Current macroblock | |

Figure 12, prior art

| | |
|---|---|
| Predictor A | Predictor B |
| | |
| Predictor C | Current |

Figure 13, prior art

| | Predictor A | Predictor B |
|---|---|---|
| | | |
| Predictor C | Current | |
| | | |

Figure 14, prior art

```
Median3 (a, b, c) {
    if (a > b) {
        if (b > c)
            median = b
        else if (a > c)
            median = c
        else
            median = a
    }
    else if (a > c)
        median = a
    else if (b > c)
        median = c
    else median = b
    return median
}
```

1400

Figure 15, prior art
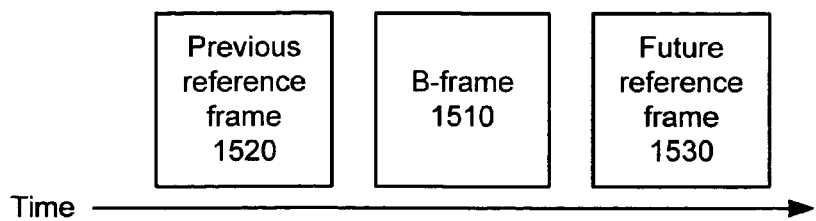
Figure 16
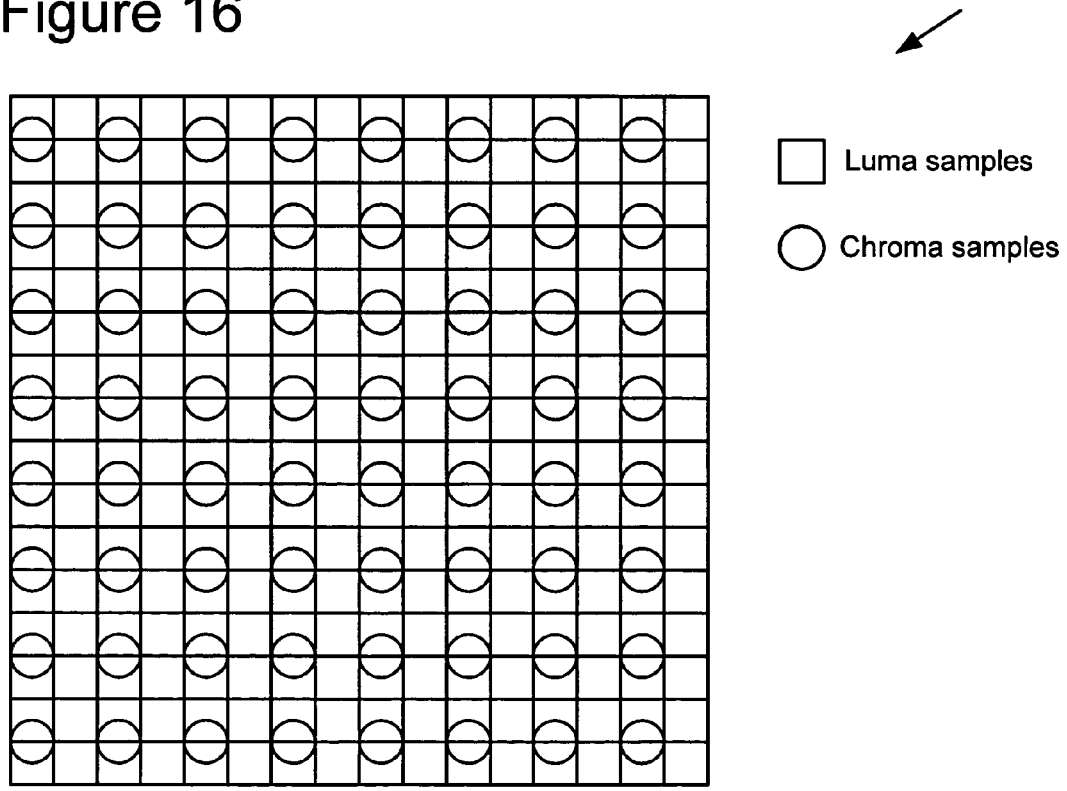

```
// ix and iy are temporary variables
if (all 4 luminance blocks are Inter-coded)
{
        // lmv0_x, lmv0_y is the motion vector for block 0
        // lmv1_x, lmv1_y is the motion vector for block 1
        // lmv2_x, lmv2_y is the motion vector for block 2
        // lmv3_x, lmv3_y is the motion vector for block 3
        ix = median4(lmv0_x, lmv1_x, lmv2_x, lmv3_x)
        iy = median4(lmv0_y, lmv1_y, lmv2_y, lmv3_y)
}
else if (3 of the luminance blocks are Inter-coded)
{
        // lmv0_x, lmv0_y is the motion vector for the first Inter-coded block
        // lmv1_x, lmv1_y is the motion vector for the second Inter-coded block
        // lmv2_x, lmv2_y is the motion vector for the third Inter-coded block
        ix = median3(lmv0_x, lmv1_x, lmv2_x)
        iy = median3(lmv0_y, lmv1_y, lmv2_y)
}
else if (2 of the luminance blocks are Inter-coded)
{
        // lmv0_x, lmv0_y is the motion vector for the first Inter-coded block
        // lmv1_x, lmv1_y is the motion vector for the second Inter-coded block
        ix = (lmv0_x + lmv1_x) / 2
        iy = (lmv0_y + lmv1_y) / 2
}
else
        Chroma blocks are coded as Intra
// s_RndTbl[0] = 0, s_RndTbl[1] = 0, s_RndTbl[2] = 0, s_RndTbl[3] = 1
cmv_x = (ix + s_RndTbl[ix & 3]) >> 1
cmv_y = (iy + s_RndTbl[iy & 3]) >> 1
```

Software 1880 implementing video encoder or decoder with described techniques and tools Top Field MV Luminance Blocks Bottom Field MV Derived Top Field MV Chrominance Block Derived Bottom Field MV Luminance Blocks Chrominance Block

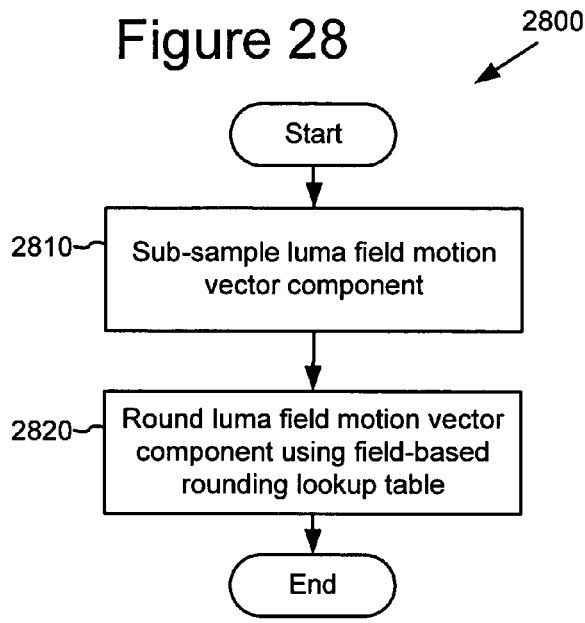
Figure 28
Figure 29
```
Int s_RndTbl [] = {0, 0, 0, 1};
Int s_RndTblField [] = {0, 0, 1, 2, 4, 4, 5, 6, 2, 2, 3, 8, 6, 6, 7, 12};
CMV_X = (LMV_X + s_RndTbl[LMV_X & 3]) >> 1;
if (LMV is a field motion vector) {
    CMV_Y = (LMV_Y >> 4)*8 + s_RndTblField [LMV_Y & 0xF];
} else {
    CMV_Y = (LMV_Y + s_RndTbl[LMV_Y & 3]) >> 1;
}
```
Figure 30
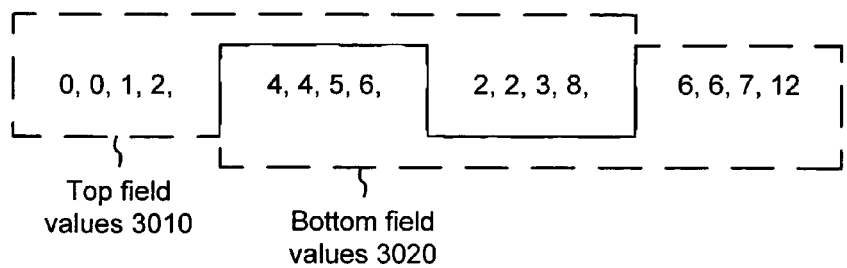

Entry Point Layer Bitstream Syntax 3100

Frame Layer Interlace P-frame Bitstream Syntax 3200

Macroblock Layer Interlace P-frame Bitstream Syntax 3300

```
if (A exists and A is not intra coded) {
   if (A is 1 MV) {
      Add MV of A to the set of candidate MVs.
   } else if (A is 4 Frame MV) {
      Add the top right block MV of A to the set of candidate MVs.
   } else if (A is 2 Field MV) {
      Average the two field MVs of A and add the resulting MV to the set of candidate MVs.
   } else if (A is 4 Field MV) {
      Average the top right block field MV and bottom right block field MV of A and add the
            resulting MV to the set of candidate MVs.
   }
} if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Average the two field MVs of B and add the resulting MV to the set of candidate MVs.
   } else if (B is 4 Field MV) {
      Average the top left block field MV and bottom left block field MV of B and add the resulting
      MV to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Average the two field MVs of C and add the resulting MV to the set of candidate MVs.
   } else if (C is 4 Field MV) {
      if (C is top right MB) {
         Average the top left block field MV and bottom left block field MV of C and add the
         resulting MV to the set of candidate MVs.
      } else { // C is top left MB
         Average the top right block field MV and bottom right block field MV of C and add the
         resulting MV to the set of candidate MVs.
      }
   }
}
```

```
// Top Left Block MV
if (A exists and A is not intra coded) {
   if (A is 1 MV) {
      Add MV of A to the set of candidate MVs.
   } else if (A is 4 Frame MV) {
      Add the top right block MV of A to the set of candidate MVs.
   } else if (A is 2 Field MV) {
      Average the two field MVs of A and add the resulting MV to the set of candidate MVs.
   } else if (A is 4 Field MV) {
      Average the top right block field MV and bottom right block field MV of A and add the
      resulting MV to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Average the two field MVs of B and add the resulting MV to the set of candidate MVs.
   } else if (B is 4 Field MV) {
      Average the top left block field MV and bottom left block field MV of B and add the resulting
      MV to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Average the two field MVs of C and add the resulting MV to the set of candidate MVs.
   } else if (C is 4 Field MV) {
      if (C is top right MB) {
         Average the top left block field MV and bottom left block field MV of C and add the
         resulting MV to the set of candidate MVs.
      } else { // C is top left MB
         Average the top right block field MV and bottom right block field MV of C and add the
         resulting MV to the set of candidate MVs.
      }
   }
}
```

```
// Top Right Block MV
Add the top left block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Average the two field MVs of B and add the resulting MV to the set of candidate MVs.
   } else if (B is 4 Field MV) {
      Average the top right block field MV and bottom right
      block field MV of B and add the resulting MV to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Average the two field MVs of C and add the resulting MV to the set of candidate MVs.
   } else if (C is 4 Field MV) {
      if (C is top right MB) {
         Average the top left block field MV and bottom left block field MV of C and add the
         resulting MV to the set of candidate MVs.
      } else { // C is top left MB
         Average the top right block field MV and bottom right block field MV of C and add the
         resulting MV to the set of candidate MVs.
      }
   }
}
```

```
// Bottom Left Block MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Average the two field MVs of A and add the resulting MV to the set of candidate
      MVs.
   } else if (A is 4 Field MV) {
      Average the top right block field MV and bottom right block field MV of A and add the
      resulting MV to the set of candidate MVs.
   }
}

Add the top left block MV of the current MB to the set of candidate MVs.

Add the top right block MV of the current MB to the set of candidate MVs.
```

```
// Bottom Right Block MV
Add the bottom left block MV of the current MB to the set of candidate MVs.

Add the top left block MV of the current MB to the set of candidate MVs.

Add the top right block MV of the current MB to the set of candidate MVs.
```

```
// Top Field MV
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Add the top field MV of A to the set of candidate MVs.
    } else if (A is 4 Field MV) {
        Add the top right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the top field MV of B to the set of candidate MVs.
    } else if (B is 4 Field MV) {
        Add the top left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the top field MV of C to the set of candidate MVs.
    } else if (C is 4 Field MV) {
        if (C is top right MB) {
            Add the top left field block MV of C to the set of candidate MVs.
        } else { // C is top left MB
            Add the top right field block MV of C to the set of candidate MVs.
        }
    }
}
```

Figure 40

```
// Bottom Field MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Add the bottom field MV of A to the set of candidate MVs.
   } else if (A is 4 Field MV) {
      Add the bottom right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the bottom field MV of B to the set of candidate MVs.
   } else if (B is 4 Field MV) {
      Add the bottom left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

```
// Top Left Field Block MV
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Add the top field MV of A to the set of candidate MVs.
    } else if (A is 4 Field MV) {
        Add the top right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the top field MV of B to the set of candidate MVs.
    } else if (B is 4 Field MV) {
        Add the top left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the top field MV of C to the set of candidate MVs.
    } else if (C is 4 Field MV) {
        if (C is top right MB) {
            Add the top left field block MV of C to the set of candidate MVs.
        } else { // C is top left MB
            Add the top right field block MV of C to the set of candidate MVs.
        }
    }
}
```

Figure 42

```
// Top Right Field Block MV
Add the top left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the top field MV of B to the set of candidate MVs.
   } else if (B is 4 Field MV) {
      Add the top right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the top field MV of C to the set of candidate MVs.
   } else if (C is 4 Field MV) {
      if (C is top right MB) {
         Add the top left field block MV of C to the set of candidate MVs.
      } else { // C is top left MB
         Add the top right field block MV of C to the set of candidate MVs.
      }
   }
}
```

```
// Bottom Left Field Block MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Add the bottom field MV of A to the set of candidate MVs.
   } else if (A is 4 Field MV) {
      Add the bottom right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the bottom field MV of B to the set of candidate MVs.
   } else if (B is 4 Field MV) {
      Add the bottom left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

```
// Bottom Right Field Block MV
Add the bottom left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the bottom field MV of B to the set of candidate MVs.
   } else if (B is 4 Field MV) {
      Add the bottom right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

Figure 45

```
if (TotalValidMV >= 2) {
    // Note that if there are only two valid MVs, then the
    // third ValidMV is set to be (0, 0)
    PMVx = median3 (ValidMVx [0], ValidMVx [1], ValidMVx [2]);
    PMVy = median3 (ValidMVy [0], ValidMVy [1], ValidMVy [2]);
} else if (TotalValidMV is 1) {
    PMVx = ValidMVx [0];
    PMVy = ValidMVy [0];
} else {
    PMVx = 0;
    PMVy = 0;
}
```

```
if (TotalValidMV == 3) {
    if (NumSameFieldMV == 3 || NumOppFieldMV == 3) {
        PMVx = median3 (ValidMVx [0], ValidMVx [1], ValidMVx [2]);
        PMVy = median3 (ValidMVy [0], ValidMVy [1], ValidMVy [2]);
    } else if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 2) {
    if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 1) {
    PMVx = ValidMVx [0];
    PMVy = ValidMVy [0];
} else {
    PMVx = 0;
    PMVy = 0;
}
```

```
offset_table1[9] = {0, 1, 2, 4, 8, 16, 32, 64, 128,}
offset_table2[9] = {0, 1, 3, 7, 15, 31, 63, 127, 255}
index = vlc_decode()    // Use the table indicated by MVTAB in the picture
layer
if (index == 71)
{
        dmv_x = get_bits(k_x)
        dmv_y = get_bits(k_y)
}
else
{
    if (extend_x == 1)
       offset_table = offset_table2
    else
       offset_table = offset_table1
index1 = (index + 1) % 9
    if (index1 != 0)
    {
       val = get_bits (index1 + extend_x)
       sign = 0 - (val & 1)
       dmv_x = sign ^ ((val >> 1) + offset_table[index1])
       dmv_x = dmv_x - sign
    }
    else
       dmv_x = 0
    if (extend_y == 1)
       offset_table = offset_table2
    else
       offset_table = offset_table1
index1 = (index + 1) / 9
    if (index1 != 0)
    {
       val = get_bits (index1 + extend_y)
       sign = 0 - (val & 1)
       dmv_y = sign ^ ((val >> 1) + offset_table[index1])
       dmv_y = dmv_y - sign
    }
    else
       dmv_y = 0
}
```

```
offset_table[9] = {0, 1, 2, 4, 8, 16, 32, 64, 128}
index = vlc_decode()     // Use the table indicated by MVTAB in the picture
layer
if (index == 0) {
        dmv_x = 1 - 2 * get_bits(1)
        dmv_y = 0
}
if (index == 125)
{
        dmv_x = get_bits(k_x - halfpel_flag)
        dmv_y = get_bits(k_y - halfpel_flag)
}
else
{
index1 = (index + 1) % 9
    val = get_bits (index1)
    sign = 0 - (val & 1)
    dmv_x = sign ^ ((val >> 1) + offset_table[index1])
    dmv_x = dmv_x - sign index1 = (index + 1) / 9
    val = get_bits (index1)
    sign = 0 - (val & 1)
    dmv_y = sign ^ ((val >> 1) + offset_table[index1])
    dmv_y = dmv_y - sign
}
```

US 7,352,905 B2

CHROMA MOTION VECTOR DERIVATION

RELATED APPLICATION INFORMATION

This application claims the benefit of U.S. Provisional Patent Application No. 60/501,081, entitled "Video Encoding and Decoding Tools and Techniques," filed Sep. 7, 2003, which is hereby incorporated by reference.

The following co-pending U.S. patent applications relate to the present application and are hereby incorporated by reference: 1) U.S. patent application Ser. No. 10/933,882, entitled, "Motion Vector Coding and Decoding in Interlaced Frame Coded Pictures," filed concurrently herewith; and 2) U.S. patent application Ser. No. 10/934,929, entitled, "Macroblock Information Signaling For Interlaced Frames," filed concurrently herewith.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for progressive and interlaced video coding and decoding are described. For example, an encoder/decoder derives a chroma motion vector for each luma motion vector in a macroblock.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-frames or key frames. Inter compression techniques compress frames with reference to preceding and/or following frames, and inter-compressed frames are typically called predicted frames, P-frames, or B-frames.

I. Inter Compression in Windows Media Video, Versions 8 and 9

Microsoft Corporation's Windows Media Video, Version 8["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

Inter compression in the WMV8 encoder uses block-based motion compensated prediction coding followed by transform coding of the residual error. FIGS. 1 and 2 illustrate the block-based inter compression for a predicted frame in the WMV8 encoder. In particular, FIG. 1 illustrates motion estimation for a predicted frame 110 and FIG. 2 illustrates compression of a prediction residual for a motion-compensated block of a predicted frame.

For example, in FIG. 1, the WMV8 encoder computes a motion vector for a macroblock 115 in the predicted frame 110. To compute the motion vector, the encoder searches in a search area 135 of a reference frame 130. Within the search area 135, the encoder compares the macroblock 115 from the predicted frame 110 to various candidate macroblocks in order to find a candidate macroblock that is a good match. The encoder outputs information specifying the motion vector (entropy coded) for the matching macroblock.

Since a motion vector value is often correlated with the values of spatially surrounding motion vectors, compression of the data used to transmit the motion vector information can be achieved by selecting a motion vector predictor based upon motion vectors of neighboring macroblocks and predicting the motion vector for the current macroblock using the motion vector predictor. The encoder can encode the differential between the motion vector and the predictor. After reconstructing the motion vector by adding the differential to the predictor, a decoder uses the motion vector to compute a prediction macroblock for the macroblock 115 using information from the reference frame 130, which is a previously reconstructed frame available at the encoder and the decoder. The prediction is rarely perfect, so the encoder usually encodes blocks of pixel differences (also called the error or residual blocks) between the prediction macroblock and the macroblock 115 itself.

FIG. 2 illustrates an example of computation and encoding of an error block 235 in the WMV8 encoder. The error block 235 is the difference between the predicted block 215 and the original current block 225. The encoder applies a discrete cosine transform ["DCT"] 240 to the error block 235, resulting in an 8×8 block 245 of coefficients. The encoder then quantizes 250 the DCT coefficients, resulting in an 8×8 block of quantized DCT coefficients 255. The encoder scans 260 the 8×8 block 255 into a one-dimensional array 265 such that coefficients are generally ordered from lowest frequency to highest frequency. The encoder entropy encodes the scanned coefficients using a variation of run length coding 270. The encoder selects an entropy code from one or more run/level/last tables 275 and outputs the entropy code.

FIG. 3 shows an example of a corresponding decoding process 300 for an inter-coded block. In summary of FIG. 3, a decoder decodes (310, 320) entropy-coded information representing a prediction residual using variable length decoding 310 with one or more run/level/last tables 315 and run length decoding 320. The decoder inverse scans 330 a one-dimensional array 325 storing the entropy-decoded information into a two-dimensional block 335. The decoder inverse quantizes and inverse discrete cosine transforms (together, 340) the data, resulting in a reconstructed error block 345. In a separate motion compensation path, the decoder computes a predicted block 365 using motion vector information 355 for displacement from a reference frame.

The decoder combines 370 the predicted block 365 with the reconstructed error block 345 to form the reconstructed block 375.

The amount of change between the original and reconstructed frames is the distortion and the number of bits required to code the frame indicates the rate for the frame. The amount of distortion is roughly inversely proportional to the rate.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 4, an interlaced video frame 400 includes top field 410 and bottom field 420. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present because the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. P-Frame Coding and Decoding in a Previous WMV Encoder and Decoder

The encoder and decoder use progressive and interlace coding and decoding in P-frames. In interlaced and progressive P-frames, a motion vector is encoded in the encoder by computing a differential between the motion vector and a motion vector predictor, which is computed based on neighboring motion vectors. And, in the decoder, the motion vector is reconstructed by adding the motion vector differential to the motion vector predictor, which is again computed (this time in the decoder) based on neighboring motion vectors. Thus a motion vector predictor for the current macroblock or field of the current macroblock is selected based on the candidates, and a motion vector differential is calculated based on the motion vector predictor. The motion vector can be reconstructed by adding the motion vector differential to the selected motion vector predictor at either the encoder or the decoder side. Typically, luminance motion vectors are reconstructed from the encoded motion information, and chrominance motion vectors are derived from the reconstructed luminance motion vectors.

A. Progressive P-Frame Coding and Decoding

For example, in the encoder and decoder, progressive P-frames can contain macroblocks encoded in one motion vector (1MV) mode or in four motion vector (4MV) mode, or skipped macroblocks, with a decision generally made on a macroblock-by-macroblock basis. P-frames with only 1MV macroblocks (and, potentially, skipped macroblocks) are referred to as 1MV P-frames, and P-frames with both 1MV and 4MV macroblocks (and, potentially, skipped macroblocks) are referred to as Mixed-MV P-frames. One luma motion vector is associated with each 1MV macroblock, and up to four luma motion vectors are associated with each 4MV macroblock (one for each block).

FIGS. 5A and 5B are diagrams showing the locations of macroblocks considered for candidate motion vector predictors for a macroblock in a 1MV progressive P-frame. The candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). When Predictor A is out of bounds because the macroblock is in the top row, the predictor is Predictor C. Various other rules address other special cases such as intra-coded predictors.

FIGS. 6A-10 show the locations of the blocks or macroblocks considered for the up-to-three candidate motion vectors for a motion vector for a 1MV or 4MV macroblock in a Mixed-MV frame. In the following figures, the larger squares are macroblock boundaries and the smaller squares are block boundaries. For the special case where the frame is one macroblock wide, the predictor is always Predictor A (the top predictor). Various other rules address other special cases such as top row blocks for top row 4MV macroblocks, top row 1MV macroblocks, and intra-coded predictors.

FIGS. 6A and 6B are diagrams showing locations of blocks considered for candidate motion vector predictors for a 1MV current macroblock in a Mixed-MV frame. The neighboring macroblocks may be 1MV or 4MV macroblocks. FIGS. 6A and 6B show the locations for the candidate motion vectors assuming the neighbors are 4MV (i.e., predictor A is the motion vector for block 2 in the macroblock above the current macroblock, and predictor C is the motion vector for block 1 in the macroblock immediately to the left of the current macroblock). If any of the neighbors is a 1MV macroblock, then the motion vector predictor shown in FIGS. 5A and 5B is taken to be the motion vector predictor for the entire macroblock. As FIG. 6B shows, if the macroblock is the last macroblock in the row, then Predictor B is from block 3 of the top-left macroblock instead of from block 2 in the top-right macroblock as is the case otherwise.

FIGS. 7A-10 show the locations of blocks considered for candidate motion vector predictors for each of the 4 luminance blocks in a 4MV macroblock. FIGS. 7A and 7B are diagrams showing the locations of blocks considered for candidate motion vector predictors for a block at position 0; FIGS. 8A and 8B are diagrams showing the locations of blocks considered for candidate motion vector predictors for a block at position 1; FIG. 9 is a diagram showing the locations of blocks considered for candidate motion vector predictors for a block at position 2; and FIG. 10 is a diagram showing the locations of blocks considered for candidate motion vector predictors for a block at position 3. Again, if a neighbor is a 1MV macroblock, the motion vector predictor for the macroblock is used for the blocks of the macroblock.

For the case where the macroblock is the first macroblock in the row, Predictor B for block 0 is handled differently than block 0 for the remaining macroblocks in the row (see FIGS. 7A and 7B). In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently (FIGS. 8A and 8B). In this case, the predictor is taken from block 2 in the macroblock immediately above the current macroblock instead of from block 2 in the macroblock above and to the right of the current macroblock, as is the case otherwise. In general, if the macroblock is in the first macroblock column, then Predictor C for blocks 0 and 2 are set equal to 0.

B. Interlaced P-Frame Coding and Decoding

The encoder and decoder use a 4:1:1 macroblock format for interlaced P-frames, which can contain macroblocks encoded in field mode or in frame mode, or skipped macroblocks, with a decision generally made on a macroblock-by-macroblock basis. Two motion vectors are associated with each field-coded macroblock (one motion vector per field), and one motion vector is associated with each frame-coded macroblock. An encoder jointly encodes motion information, including horizontal and vertical motion vector differential components, potentially along with other signaling information.

FIGS. 11, 12 and 13 show examples of candidate predictors for motion vector prediction for frame-coded 4:1:1 macroblocks and field-coded 4:1:1 macroblocks, respectively, in interlaced P-frames in a previous WMV encoder and decoder. FIG. 11 shows candidate predictors A, B and C for a current frame-coded 4:1:1 macroblock in an interior position in an interlaced P-frame (not the first or last macroblock in a macroblock row, not in the top row). Predictors can be obtained from different candidate directions other than those labeled A, B, and C (e.g., in special cases such as when the current macroblock is the first macroblock or last macroblock in a row, or in the top row, since certain predictors are unavailable for such cases). For a current frame-coded macroblock, predictor candidates are calculated differently depending on whether the neighboring macroblocks are field-coded or frame-coded. For a neighboring frame-coded macroblock, the motion vector is simply taken as the predictor candidate. For a neighboring field-coded macroblock, the candidate motion vector is determined by averaging the top and bottom field motion vectors.

FIGS. 12 and 13 show candidate predictors A, B and C for a current field in a field-coded 4:1:1 macroblock in an interior position in the field. In FIG. 12, the current field is a bottom field, and the bottom field motion vectors in the neighboring macroblocks are used as candidate predictors. In FIG. 13, the current field is a top field, and the top field motion vectors in the neighboring macroblocks are used as candidate predictors. Thus, for each field in a current field-coded macroblock, the number of motion vector predictor candidates for each field is at most three, with each candidate coming from the same field type (e.g., top or bottom) as the current field. Again, various special cases (not shown) apply when the current macroblock is the first macroblock or last macroblock in a row, or in the top row, since certain predictors are unavailable for such cases.

To select a predictor from a set of predictor candidates, the previous WMV encoder and decoder in question use different selection algorithms, such as a median-of-three algorithm or a median-of-four algorithm. A procedure for median-of-three prediction is described in pseudo-code 1400 in FIG. 14.

IV. B-Frame Coding and Decoding in a Previous WMV Encoder and Decoder

A previous WMV encoder and decoder use progressive and interlaced B-frames. B-frames use two frames from the source video as reference (or anchor) frames rather than the one anchor used in P-frames. Among anchor frames for a typical B-frame, one anchor frame is from the temporal past and one anchor frame is from the temporal future. Referring to FIG. 15, a B-frame 1510 in a video sequence has a temporally previous reference frame 1520 and a temporally future reference frame 1530. Encoded bit streams with B-frames typically use less bits than encoded bit streams with no B-frames, while providing similar visual quality. A decoder also can accommodate space and time restrictions by opting not to decode or display B-frames, since B-frames are not generally used as reference frames.

While macroblocks in forward-predicted frames (e.g., P-frames) have only one directional mode of prediction (forward, from previous I- or P-frames), macroblocks in B-frames can be predicted using five different prediction modes: forward, backward, direct, interpolated and intra. The encoder selects and signals different prediction modes in the bit stream. Forward mode is similar to conventional P-frame prediction. In forward mode, a macroblock is derived from a temporally previous anchor. In backward mode, a macroblock is derived from a temporally subsequent anchor. Macroblocks predicted in direct or interpolated modes use both forward and backward anchors for prediction.

V. Chroma Motion Vectors in a Previous WMV Encoder and Decoder

Chroma motion vector derivation is an important aspect of video coding and decoding. Accordingly, software for a previous WMV encoder and decoder uses rounding and sub-sampling to derive chrominance (or "chroma") motion vectors from luminance (or "luma") motion vectors.

A. Luma Motion Vector Reconstruction

A previous WMV encoder and decoder reconstruct motion vectors for 1MV and 4MV macroblocks in progressive frames, and frame-coded or field-coded macroblocks in interlaced frames. A luma motion vector is reconstructed by adding a motion vector differential to a motion vector predictor. In 1MV macroblocks in progressive frames and in frame-coded macroblocks in interlaced frames, a single luma motion vector applies to the four blocks that make up the luma component of the macroblock. In 4MV macroblocks in progressive frames, each of the inter-coded luma blocks in a macroblock has its own luma motion vector. Therefore, there are up to four luma motion vectors for each 4MV macroblock, depending on the number of inter-coded blocks in the macroblock. In field-coded macroblocks in interlaced frames, there are two luma motion vectors—one for each field.

B. Derivation and Reconstruction of Chroma Motion Vectors

The encoder and decoder use a 4:2:0 macroblock format for progressive frames. The frame data includes a luma ("Y") component and chroma components ("U" and "V"). Each macroblock including four 8×8 luminance blocks (at times treated as one 16×16 macroblock) and two 8×8 chrominance blocks. FIG. 16 shows a 4:2:0 YUV sampling grid. The 4:2:0 YUV sampling grid of FIG. 16 shows a spatial relationship between luma and chroma samples of a macroblock. The resolution of the chroma samples is half the resolution of the luma samples in both horizontal (x) and vertical (y) directions. Thus, in order to derive distances on the chroma grid from corresponding distances on the luma grid, a previous WMV encoder and decoder divides luma motion vector components by 2. This is the basis for a down-sampling step in deriving chroma motion vectors from luma motion vectors in progressive frames.

The encoder and decoder, chroma vectors in progressive frames are reconstructed in two steps. First, the nominal chroma motion vector is obtained by combining and scaling the luma motion vectors appropriately. Second, rounding is optionally performed after scaling to reduce decoding time.

For example, in a 1MV macroblock, chroma motion vector components (cmv_x and cmv_y) are derived from luma motion vector components (lmv_x and lmv_y) by scaling the luma components according to the following pseudo code:

```
// s_RndTbl[0] = 0, s_RndTbl[1] = 0, s_RndTbl[2] = 0,
s_RndTbl[3] = 1
cmv_x = (lmv_x + s_RndTbl[lmv_x & 3]) >> 1
cmv_y = (lmv_y + s_RndTbl[lmv_y & 3]) >> 1
```

Scaling is performed with a rounding table array (s_Rnd-Tbl[ ]) such that half-pixel offsets are preferred over quarter-pixel offsets. Additional rounding can be performed after the scaling operation to reduce decoding time.

In a 4MV macroblock, the encoder and decoder derive a chroma motion vector from the motion information in the four luma blocks according to the pseudocode 1700 of FIG. 17. As shown in FIG. 17, the encoder and decoder derive chroma motion vector components using median prediction or averaging of luma motion vectors of inter-coded blocks in the macroblock. In the special case where three or more of the blocks are intra-coded, the chroma blocks are also intra-coded.

The encoder and decoder perform additional rounding if the sequence-level bit FASTUVMC=1. The rounding signaled by FASTUVMC favors half-pixel and integer pixel positions for chroma motion vectors, which can speed up encoding.

A previous WMV encoder and decoder use a 4:1:1 macroblock format for interlaced frames. For interlaced frames, the frame data also includes a luma ("Y") component and chroma components ("U" and "V"). However, in a 4:1:1 macroblock format, the resolution of the chroma samples is one-quarter the resolution of the luma samples in the horizontal direction, and full resolution in the vertical direction. Thus, in order to derive distances on the chroma grid from corresponding distances on the luma grid, a previous WMV encoder and decoder divides horizontal luma motion vector components by 4.

For a frame-coded macroblock, one chroma motion vector corresponding to the single luminance motion vector is derived. For a field-coded macroblock, two chrominance motion vectors are derived corresponding to the two luminance motion vectors—one for the top field and one for the bottom field.

In a previous WMV encoder and decoder, the rules for deriving chroma motion vectors in interlaced frames are the same for both field-coded macroblocks and frame-coded macroblocks. The x-component of the chrominance motion vector is scaled (down-sampled) by a factor of four, while the y-component of the chrominance motion vector remains the same as the luminance motion vector. The scaled x-component of the chrominance motion vector is also rounded to a neighboring quarter pixel location. Chroma motion vectors are reconstructed according to the pseudo-code below, in which cmv_x and cmv_y denote the chroma motion vector components, and lmv_x and lmv_y denote the corresponding luminance motion vector components.

```
frac_x4 = (lmv_x << 2) % 16;
int_x4 = (lmv_x << 2) – frac_x;
ChromaMvRound [16] = {0, 0, 0, .25, .25,
.25, .5, .5, .5, .5, .5, .75, .75, .75, 1, 1};
cmv_y = lmv_y;
cmv_x = Sign (lmv_x) * (int_x4 >> 2) + ChromaMvRound [frac_x4];
```

VI. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Chroma Motion Vectors in the Standards

One of the primary methods used to achieve data compression of digital video sequences in the international standards is to reduce the temporal redundancy between pictures. These popular compression schemes (MPEG-1, MPEG-2, MPEG-4, H.261, H.263, etc) use motion estimation and compensation. For example, a current frame is divided into uniform square regions (e.g., blocks and/or macroblocks) of luma and chroma information. A matching region for each current region is specified by sending motion vector information for the region. For example, a luma motion vector indicates the location of the region of luma samples in a previously coded (and reconstructed) frame that is to be used as a predictor for the current region. A pixel-by-pixel difference, called the error signal, between the current region and the region in the reference frame is derived. This error signal usually has lower entropy than the original signal. Therefore, the information can be encoded at a lower rate. As in previous WMV encoders and decoders, since a motion vector value is often correlated with spatially surrounding motion vectors, compression of the data used to represent the motion vector information can be achieved by coding the differential between the current motion vector and a motion vector predictor based upon previously coded, neighboring motion vectors. Typically, chroma motion vectors are derived from luma motion vectors to avoid overhead associated with separately calculating and encoding chroma motion vectors.

Some international standards describe deriving chroma motion vectors from luma motion vectors. Section 7.6.3.7 of the MPEG-2 standard describes deriving chroma motion vectors from luma motion vectors in a 4:2:0 macroblock format by dividing each of the horizontal and vertical luma motion vector components by two to scale the chroma motion vector components appropriately. In a 4:2:2 format, the chroma information is sub-sampled only in the horizontal direction, so the vertical component is not divided by two. In a 4:4:4 format, chroma information is sampled at the same resolution as luma information, so neither component is divided by two.

Annex F of the H.263 standard describes an advanced prediction mode that uses four motion vectors per macroblock for prediction. In the advanced prediction mode, each of the four motion vectors is used for all pixels in one of the four luminance blocks in the macroblock. The motion vector for both chrominance blocks (in a 4:2:0 format) is derived by calculating the sum of the four luminance motion vector components in each direction and dividing by eight. Similarly, section 7.5.5 of the May 28, 1998 committee draft of the MPEG-4 standard describes deriving a motion vector $MVD_{CHR}$ for both chrominance blocks in a 4:2:0 format by calculating the sum of K motion vectors corresponding to K 8×8 block and dividing the sum by 2*K. Prediction for chrominance is obtained by applying the motion vector $MVD_{CHR}$ to all pixels in the two chrominance blocks.

Section 8.4.1.4 of draft JVT-d157 of the JVT/AVC standard also describes deriving chroma motion vectors from luma motion vectors in a 4:2:0 macroblock format by dividing each of the horizontal and vertical luma motion vector components by two. Section 7.4.5 of draft JVT-d157 describes macroblocks with different luma block sizes (e.g., 16×16, 16×8, 8×16 and 8×8) and associated chroma blocks. For example, for P-slices and SP-slices, "a motion vector is provided for each N×M luma block and the associated chroma blocks."

B. Limitations of the Standards

These international standards are limited in several important ways. For example, several standards use chroma motion vectors that do not sufficiently represent local changes in chroma motion. Another problem is inefficient rounding mechanisms in chroma motion vector derivation, especially for field-coded content.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for deriving chroma motion vectors. Described embodiments implement one or more of the described techniques and tools including, but not limited to, the following:

In one aspect, a decoder receives luma motion vector information for more than two luma motion vectors for one macroblock, each of the more than two luma motion vectors associated with at least part of the macroblock (e.g., a 4:2:0 macroblock). The decoder derives a chroma motion vector associated with at least part of the macroblock for each of the more than two luma motion vectors by performing at least one calculation involving a rounding table (e.g., a field-based rounding table) on the luma motion vector information, maintaining a 1:1 ratio of chroma motion vectors to luma motion vectors for the macroblock. For example, the decoder receives four luma (frame or field) motion vectors for a macroblock and derives four chroma motion vectors for the macroblock. The deriving can comprise sub-sampling and/or rounding at least a portion of the luma motion vector information using a field-based rounding table.

In another aspect, a decoder derives a chroma motion vector associated with at least part of a macroblock in an interlaced frame coded pictures (e.g., interlaced P-frame, interlaced B-frame) for each of one or more luma motion vectors, based at least in part on motion vector information for the one or more luma motion vectors. The decoder is operable to decode macroblocks predicted using four luma field motion vectors. For example, the decoder derives four chroma field motion vectors, such as by applying a field-based rounding lookup table to at least a portion of the luma motion vector information.

In another aspect, a decoder derives a chroma motion vector associated with at least part of a macroblock for each of one or more luma field motion vectors by rounding a luma field motion vector component using a field-based rounding table (e.g., an integer array) and sub-sampling the luma field motion vector component.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing motion estimation in a video encoder according to the prior art.

FIG. 2 is a diagram showing block-based compression for an 8×8 block of prediction residuals in a video encoder according to the prior art.

FIG. 3 is a diagram showing block-based decompression for an 8×8 block of prediction residuals in a video encoder according to the prior art.

FIG. 4 is a diagram showing an interlaced frame according to the prior art.

FIGS. 5A and 5B are diagrams showing locations of macroblocks for candidate motion vector predictors for a 1MV macroblock in a progressive P-frame according to the prior art.

FIGS. 6A and 6B are diagrams showing locations of blocks for candidate motion vector predictors for a 1MV macroblock in a mixed 1MV/4MV progressive P-frame according to the prior art.

FIGS. 7A, 7B, 8A, 8B, 9, and 10 are diagrams showing the locations of blocks for candidate motion vector predictors for a block at various positions in a 4MV macroblock in a mixed 1MV/4MV progressive P-frame according to the prior art.

FIG. 11 is a diagram showing candidate motion vector predictors for a current frame-coded macroblock in an interlaced P-frame according to the prior art.

FIGS. 12 and 13 are diagrams showing candidate motion vector predictors for a current field-coded macroblock in an interlaced P-frame according to the prior art.

FIG. 14 is a code diagram showing pseudo-code for performing a median-of-3 calculation according to the prior art.

FIG. 15 is a diagram showing a B-frame with past and future reference frames according to the prior art.

FIG. 16 is a diagram showing a 4:2:0 YUV sampling grid according to the prior art.

FIG. 17 is a code diagram showing pseudocode for deriving a chroma motion vector from motion information in four luma blocks of a 4MV macroblock according to the prior art.

FIG. 28 is a flow chart showing a technique for using a field-based rounding lookup table to derive chroma field motion vectors.

FIG. 29 is a code diagram showing pseudocode for deriving chroma motion vector components from luma motion vector components using a field-based rounding lookup table.

FIG. 30 is a diagram showing field designations for values in a field-based rounding lookup table.

FIG. 34 is a code listing showing pseudo-code for collecting candidate motion vectors for 1MV macroblocks in an interlaced P-frame in a combined implementation.

FIGS. 35, 36, 37, and 38 are code listings showing pseudo-code for collecting candidate motion vectors for 4 Frame MV macroblocks in an interlaced P-frame in a combined implementation.

FIGS. 39 and 40 are code listings showing pseudo-code for collecting candidate motion vectors for 2 Field MV macroblocks in an interlaced P-frame in a combined implementation.

FIGS. 41, 42, 43, and 44 are code listings showing pseudo-code for collecting candidate motion vectors for 4 Field MV macroblocks in an interlaced P-frame in a combined implementation.

FIG. 45 is a code listing showing pseudo-code for computing motion vector predictors for frame motion vectors in an interlaced P-frame in a combined implementation.

FIG. 46 is a code listing showing pseudo-code for computing motion vector predictors for field motion vectors in an interlaced P-frame in a combined implementation.

FIGS. 47A and 47B are code listings showing pseudo-code for decoding a motion vector differential for interlaced P-frames in a combined implementation.

DETAILED DESCRIPTION

The present application relates to techniques and tools for efficient compression and decompression of interlaced and progressive video. In various described embodiments, a video encoder and decoder incorporate techniques for encoding and decoding interlaced and progressive video, and corresponding signaling techniques for use with a bit stream format or syntax comprising different layers or levels (e.g., sequence level, frame level, field level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to forward prediction may also be applicable to other types of prediction.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 18:
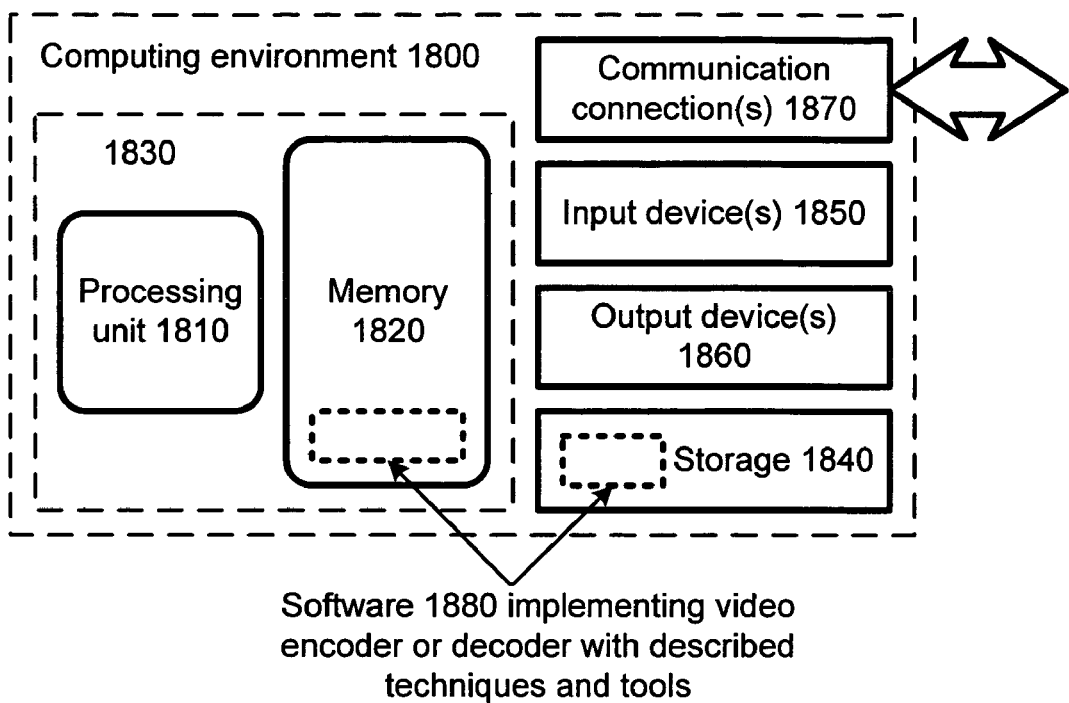
FIG. 18 is a block diagram of a suitable computing environment in conjunction with which several described embodiments may be implemented.

FIG. 18 illustrates a generalized example of a suitable computing environment 1800 in which several of the described embodiments may be implemented. The computing environment 1800 is not intended to suggest any limitation as to scope of use or functionality, as the techniques and tools may be implemented in diverse general-purpose or special-purpose computing environments.

With reference to FIG. 18, the computing environment 1800 includes at least one processing unit 1810 and memory 1820. In FIG. 18, this most basic configuration 1830 is included within a dashed line. The processing unit 1810 executes computer-executable instructions and may be a real or a virtual processor. In a multi-processing system, multiple processing units execute computer-executable instructions to increase processing power. The memory 1820 may be volatile memory (e.g., registers, cache, RAM), non-volatile memory (e.g., ROM, EEPROM, flash memory, etc.), or some combination of the two. The memory 1820 stores software 1880 implementing a video encoder or decoder with bi-directional prediction of interlaced video frames.

A computing environment may have additional features. For example, the computing environment 1800 includes storage 1840, one or more input devices 1850, one or more output devices 1860, and one or more communication connections 1870. An interconnection mechanism (not shown) such as a bus, controller, or network interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, DVDs, or any other medium which can be used to store information and which can be accessed within the computing environment 1800. The storage 1840 stores instructions for the software 1880 implementing the video encoder or decoder.

The input device(s) 1850 may be a touch input device such as a keyboard, mouse, pen, or trackball, a voice input device, a scanning device, or another device that provides input to the computing environment 1800. For audio or video encoding, the input device(s) 1850 may be a sound card, video card, TV tuner card, or similar device that accepts audio or video input in analog or digital form, or a CD-ROM or CD-RW that reads audio or video samples into the computing environment 1800. The output device(s) 1860 may be a display, printer, speaker, CD-writer, or another device that provides output from the computing environment 1800.

The communication connection(s) 1870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 1800, computer-readable media include memory 1820, storage 1840, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "ucompensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 19:
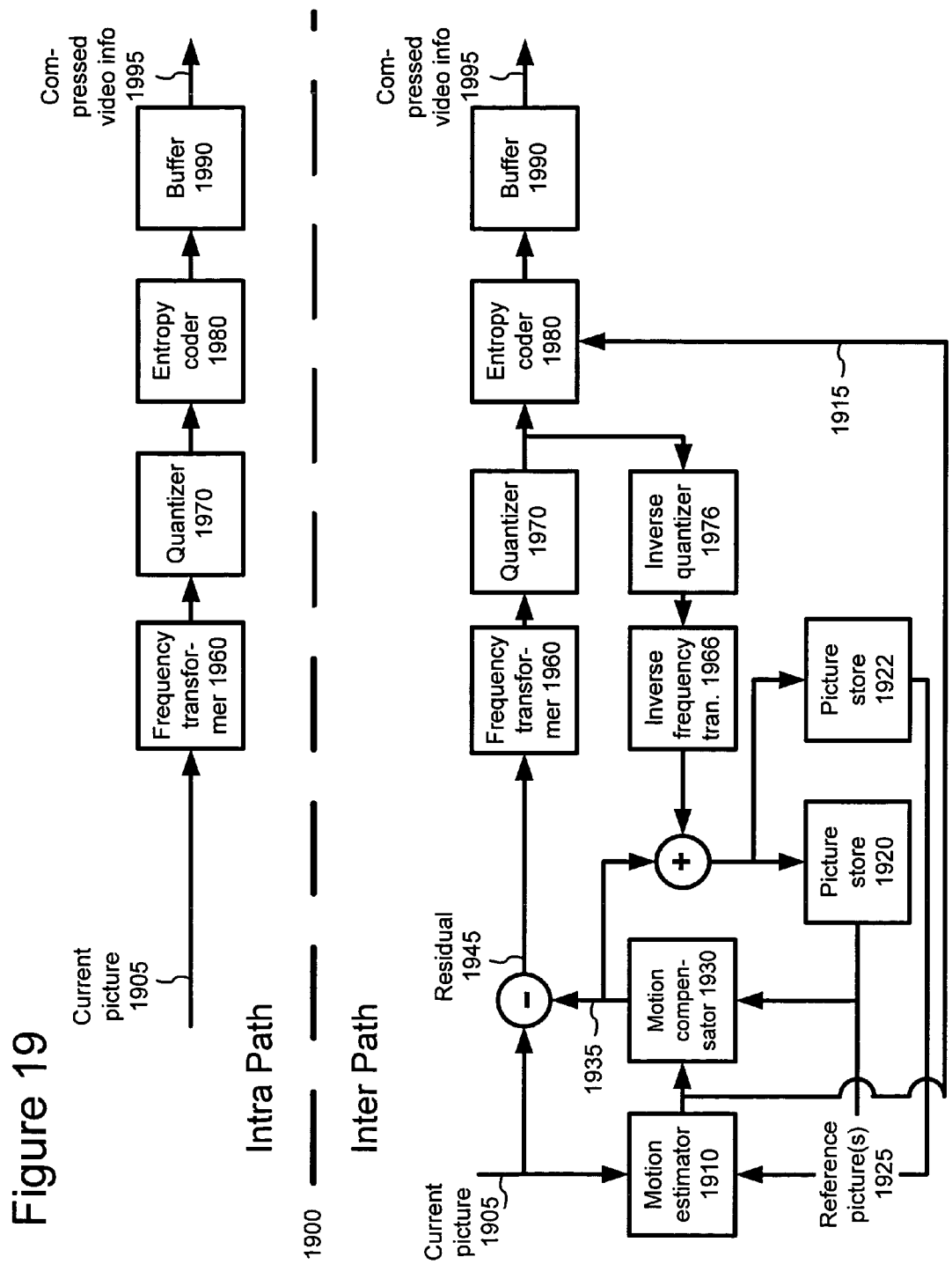
FIG. 19 is a block diagram of a generalized video encoder system in conjunction with which several described embodiments may be implemented.
Figure 20:
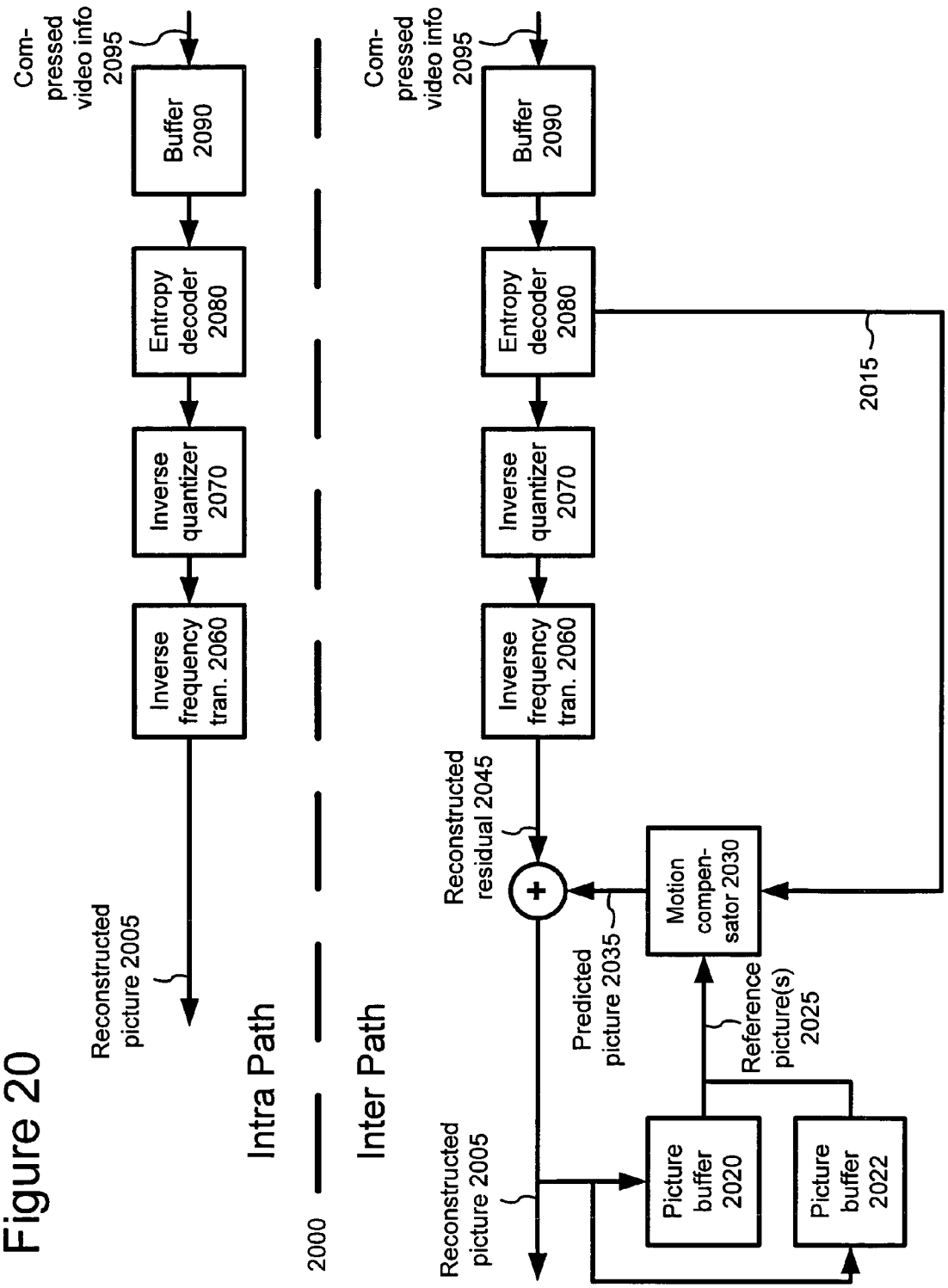
FIG. 20 is a block diagram of a generalized video decoder system in conjunction with which several described embodiments may be implemented.

FIG. 19 is a block diagram of a generalized video encoder 1900 in conjunction with which some described embodiments may be implemented. FIG. 20 is a block diagram of a generalized video decoder 2000 in conjunction with which some described embodiments may be implemented.

The relationships shown between modules within the encoder 1900 and decoder 2000 indicate general flows of information in the encoder and decoder; other relationships are not shown for the sake of simplicity. In particular, FIGS. 19 and 20 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 1900 and decoder 2000 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 1900 and decoder 2000 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 1900 and decoder 2000 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 1900 and decoder 2000 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 2100 shown in FIG. 21. The macroblock 2100 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 22A:
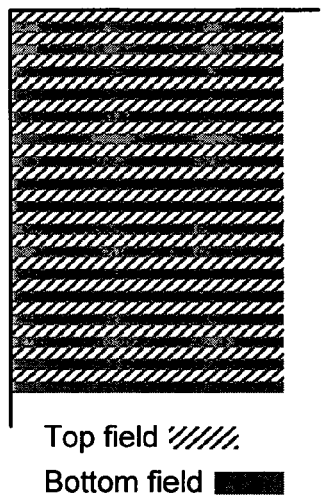
FIG. 22A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 22A shows part of an interlaced video frame 2200, including the alternating lines of the top field and bottom field at the top left part of the interlaced video frame 2200.

Figure 21:
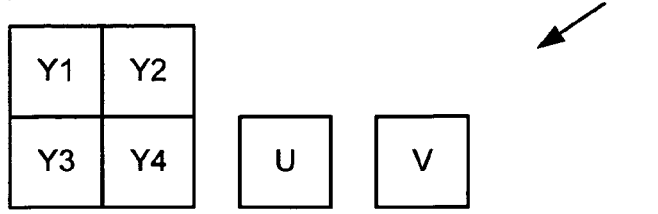
FIG. 21 is a diagram of a macroblock format used in several described embodiments.
Figure 22B:
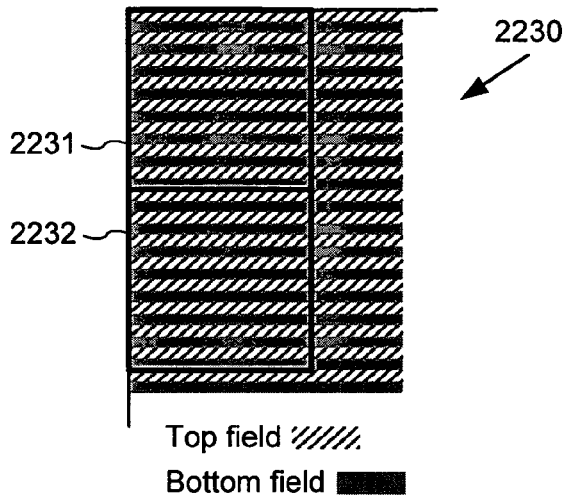
FIG. 22B is a diagram of the interlaced video frame organized for encoding/decoding as a frame.

FIG. 22B shows the interlaced video frame 2200 of FIG. 22A organized for encoding/decoding as a frame 2230. The interlaced video frame 2200 has been partitioned into macroblocks such as the macroblocks 2231 and 2232, which use a 4:2:0 format as shown in FIG. 21. In the luminance plane, each macroblock 2231, 2232 includes 8 lines from the top field alternating with 8 lines from the bottom field for 16 lines total, and each line is 16 pixels long. (The actual organization and placement of luminance blocks and chrominance blocks within the macroblocks 2231, 2232 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 22C:
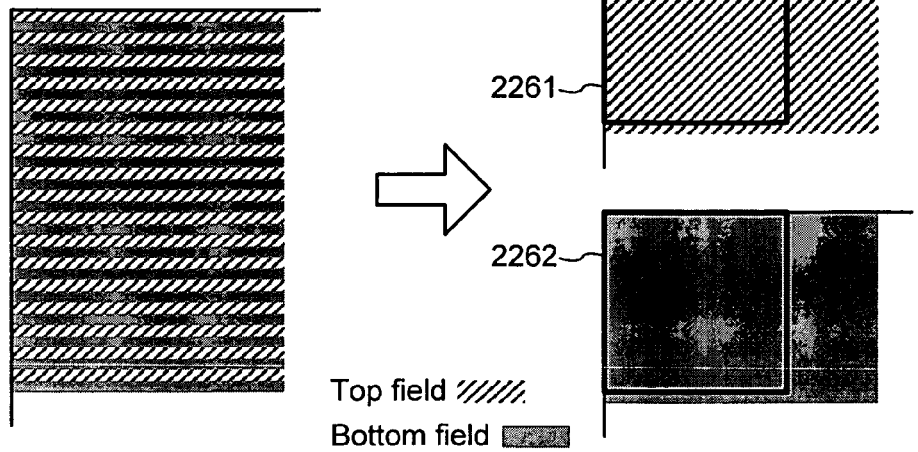
FIG. 22C is a diagram of the interlaced video frame organized for encoding/decoding as fields.

FIG. 22C shows the interlaced video frame 2200 of FIG. 22A organized for encoding/decoding as fields 2260. Each of the two fields of the interlaced video frame 2200 is partitioned into macroblocks. The top field is partitioned into macroblocks such as the macroblock 2261, and the bottom field is partitioned into macroblocks such as the macroblock 2262. (Again, the macroblocks use a 4:2:0 format as shown in FIG. 21, and the organization and placement of luminance blocks and chrominance blocks within the macroblocks are not shown.) In the luminance plane, the macroblock 2261 includes 16 lines from the top field and the macroblock 2262 includes 16 lines from the bottom field, and each line is 16 pixels long. An interlaced P-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced P-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder 1900 and decoder 2000 are object-based, use a different macroblock or block format, or perform operations on sets of pixels of different size or configuration than 8×8 blocks and 16×16 macroblocks.

B. Video Encoder

FIG. 19 is a block diagram of a generalized video encoder system 1900. The encoder system 1900 receives a sequence of video pictures including a current picture 1905 (e.g., progressive video frame, interlaced video frame, or field of an interlaced video frame), and produces compressed video information 1995 as output. Particular embodiments of video encoders typically use a variation or supplemented version of the generalized encoder 1900.

The encoder system 1900 compresses predicted pictures and key pictures. For the sake of presentation, FIG. 19 shows a path for key pictures through the encoder system 1900 and a path for predicted pictures. Many of the components of the encoder system 1900 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 1905 is a forward-predicted picture, a motion estimator 1910 estimates motion of macroblocks or other sets of pixels of the current picture 1905 with respect to one or more reference pictures, for example, the reconstructed previous picture 1925 buffered in the picture store 1920. If the current picture 1905 is a bi-directionally-predicted picture, a motion estimator 1910 estimates motion in the current picture 1905 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 1900 can use the separate stores 1920 and 1922 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882, 135, entitled, "Advanced Bi-Directional Predictive Coding of Interlaced Video," filed Jun. 29, 2004.

The motion estimator 1910 can estimate motion by pixel, ½ pixel, ¼ pixel, or other increments, and can switch the resolution of the motion estimation on a picture-by-picture basis or other basis. The motion estimator 1910 (and compensator 1930) also can switch between types of reference picture pixel interpolation (e.g., between bicubic and bilinear) on a per-frame or other basis. The resolution of the motion estimation can be the same or different horizontally and vertically. The motion estimator 1910 outputs as side information motion information 1915 such as differential motion vector information. The encoder 1900 encodes the motion information 1915 by, for example, computing one or more predictors for motion vectors, computing differentials between the motion vectors and predictors, and entropy coding the differentials. To reconstruct a motion vector, a motion compensator 1930 combines a predictor with differential motion vector information. Various techniques for computing motion vector predictors, computing differential motion vectors, and reconstructing motion vectors are described below.

The motion compensator 1930 applies the reconstructed motion vector to the reconstructed picture(s) 1925 to form a motion-compensated current picture 1935. The prediction is rarely perfect, however, and the difference between the motion-compensated current picture 1935 and the original current picture 1905 is the prediction residual 1945. During later reconstruction of the picture, the prediction residual 1945 is added to the motion compensated current picture 1935 to obtain a reconstructed picture that is closer to the original current picture 1905. In lossy compression, however, some information is still lost from the original current picture 1905. Alternatively, a motion estimator and motion compensator apply another type of motion estimation/compensation.

A frequency transformer 1960 converts the spatial domain video information into frequency domain (i.e., spectral) data. For block-based video pictures, the frequency transformer 1960 applies a DCT, variant of DCT, or other block transform to blocks of the pixel data or prediction residual data, producing blocks of frequency transform coefficients. Alternatively, the frequency transformer 1960 applies another conventional frequency transform such as a Fourier transform or uses wavelet or sub-band analysis. The frequency transformer 1960 may apply an 8×8, 8×4, 4×8, 4×4 or other size frequency transform.

A quantizer 1970 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 1900 can use frame dropping, adaptive filtering, or other techniques for rate control.

The encoder 1900 may use special signaling for a skipped macroblock, which is a macroblock that has no information of certain types (e.g., no motion information for the macroblock and no residual information).

When a reconstructed current picture is needed for subsequent motion estimation/compensation, an inverse quantizer 1976 performs inverse quantization on the quantized spectral data coefficients. An inverse frequency transformer 1966 then performs the inverse of the operations of the frequency transformer 1960, producing a reconstructed prediction residual (for a predicted picture) or a reconstructed key picture. If the current picture 1905 was a key picture, the reconstructed key picture is taken as the reconstructed current picture (not shown). If the current picture 1905 was a predicted picture, the reconstructed prediction residual is added to the motion-compensated current picture 1935 to form the reconstructed current picture. One or both of the picture stores 1920, 1922 buffers the reconstructed current picture for use in motion compensated prediction. In some embodiments, the encoder applies a de-blocking filter to the reconstructed frame to adaptively smooth discontinuities and other artifacts in the picture.

The entropy coder 1980 compresses the output of the quantizer 1970 as well as certain side information (e.g., motion information 1915, quantization step size). Typical entropy coding techniques include arithmetic coding, differential coding, Huffman coding, run length coding, LZ coding, dictionary coding, and combinations of the above. The entropy coder 1980 typically uses different coding techniques for different kinds of information (e.g., DC coefficients, AC coefficients, different kinds of side information), and can choose from among multiple code tables within a particular coding technique.

The entropy coder 1980 provides compressed video information 1995 to the multiplexer ["MUX"] 1990. The MUX 1990 may include a buffer, and a buffer level indicator may be fed back to bit rate adaptive modules for rate control. Before or after the MUX 1990, the compressed video information 1995 can be channel coded for transmission over the network. The channel coding can apply error detection and correction data to the compressed video information 1995.

C. Video Decoder

FIG. 20 is a block diagram of a general video decoder system 2000. The decoder system 2000 receives information 2095 for a compressed sequence of video pictures and produces output including a reconstructed picture 2005 (e.g., progressive video frame, interlaced video frame, or field of an interlaced video frame). Particular embodiments of video decoders typically use a variation or supplemented version of the generalized decoder 2000.

The decoder system 2000 decompresses predicted pictures and key pictures. For the sake of presentation, FIG. 20 shows a path for key pictures through the decoder system 2000 and a path for forward-predicted pictures. Many of the components of the decoder system 2000 are used for decompressing both key pictures and predicted pictures. The exact operations performed by those components can vary depending on the type of information being decompressed.

A DEMUX 2090 receives the information 2095 for the compressed video sequence and makes the received information available to the entropy decoder 2080. The DEMUX 2090 may include a jitter buffer and other buffers as well. Before or after the DEMUX 2090, the compressed video information can be channel decoded and processed for error detection and correction.

The entropy decoder 2080 entropy decodes entropy-coded quantized data as well as entropy-coded side information (e.g., motion information 2015, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 2080 typically uses different decoding techniques for different kinds of information (e.g., DC coefficients, AC coefficients, different kinds of side information), and can choose from among multiple code tables within a particular decoding technique.

The decoder 2000 decodes the motion information 2015 by, for example, computing one or more predictors for motion vectors, entropy decoding differential motion vectors, and combining decoded differential motion vectors with predictors to reconstruct motion vectors.

A motion compensator 2030 applies motion information 2015 to one or more reference pictures 2025 to form a prediction 2035 of the picture 2005 being reconstructed. For example, the motion compensator 2030 uses one or more macroblock motion vector to find macroblock(s) in the reference picture(s) 2025. One or more picture stores (e.g., picture store 2020, 2022) store previous reconstructed pictures for use as reference pictures. Typically, B-pictures have more than one reference picture (e.g., at least one temporally previous reference picture and at least one temporally future reference picture). Accordingly, the decoder system 2000 can use separate picture stores 2020 and 2022 for multiple reference pictures. The motion compensator 2030 can compensate for motion at pixel, ½ pixel, ¼ pixel, or other increments, and can switch the resolution of the motion compensation on a picture-by-picture basis or other basis. The motion compensator 2030 also can switch between types of reference picture pixel interpolation (e.g., between bicubic and bilinear) on a per-frame or other basis. The resolution of the motion compensation can be the same or different horizontally and vertically. Alternatively, a motion compensator applies another type of motion compensation. The prediction by the motion compensator is rarely perfect, so the decoder 2000 also reconstructs prediction residuals.

An inverse quantizer 2070 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 2060 converts the quantized, frequency domain data into spatial domain video information. For block-based video pictures, the inverse frequency transformer 2060 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 2060 applies another conventional inverse frequency transform such as an inverse Fourier transform or uses wavelet or sub-band synthesis. The inverse frequency transformer 2060 may apply an 8×8, 8×4, 4×8, 4×4, or other size inverse frequency transform.

For a predicted picture, the decoder 2000 combines the reconstructed prediction residual 2045 with the motion compensated prediction 2035 to form the reconstructed picture 2005. When the decoder needs a reconstructed picture 2005 for subsequent motion compensation, one or both of the picture stores (e.g., picture store 2020) buffers the reconstructed picture 2005 for use in predicting the next picture. In some embodiments, the decoder 2000 applies a de-blocking filter to the reconstructed picture to adaptively smooth discontinuities and other artifacts in the picture.

III. Interlaced P-frames

A typical interlaced video frame consists of two fields (e.g., a top field and a bottom field) scanned at different times. In general, it is more efficient to encode stationary regions of an interlaced video frame by coding fields together ("frame mode" coding). On the other hand, it is often more efficient to code moving regions of an interlaced video frame by coding fields separately ("field mode" coding), because the two fields tend to have different motion. A forward-predicted interlaced video frame may be coded as two separate forward-predicted fields—interlaced P-fields. Coding fields separately for a forward-predicted interlaced video frame may be efficient, for example, when there is high motion throughout the interlaced video frame, and hence much difference between the fields. An interlaced P-field references one or more previously decoded fields. For example, in some implementations, an interlaced P-field references either one or two previously decoded fields. For more information on interlaced P-fields, see U.S. Provisional Patent Application No. 60/501,081, entitled "Video Encoding and Decoding Tools and Techniques," filed Sep. 7, 2003, and U.S. patent application Ser. No. 10/857,473, entitled, "Predicting Motion Vectors for Fields of Forward-predicted Interlaced Video Frames," filed May 27, 2004, which is incorporated herein by reference.

Or, a forward-predicted interlaced video frame may be coded using a mixture of field coding and frame coding, as an interlaced P-frame. For a macroblock of an interlaced P-frame, the macroblock includes lines of pixels for the top and bottom fields, and the lines may be coded collectively in a frame-coding mode or separately in a field-coding mode.

A. Macroblock Types in Interlaced P-frames

In some implementations, macroblocks in interlaced P-frames can be one of five types: 1MV, 2 Field MV, 4 Frame MV, 4 Field MV, and Intra.

In a 1MV macroblock, the displacement of the four luminance blocks in the macroblock is represented by a single motion vector. A corresponding chroma motion vector can be derived from the luma motion vector to represent the displacements of each of the two 8×8 chroma blocks for the motion vector. For example, referring again to the macroblock arrangement shown in FIG. 21, a 1MV macroblock 2100 includes four 8×8 luminance blocks and two 8×8 chrominance blocks. The displacement of the luminance blocks (Y1 through Y4) are represented by single motion vector, and a corresponding chroma motion vector can be derived from the luma motion vector to represent the displacements of each of the two chroma blocks (U and V).

Figure 23:
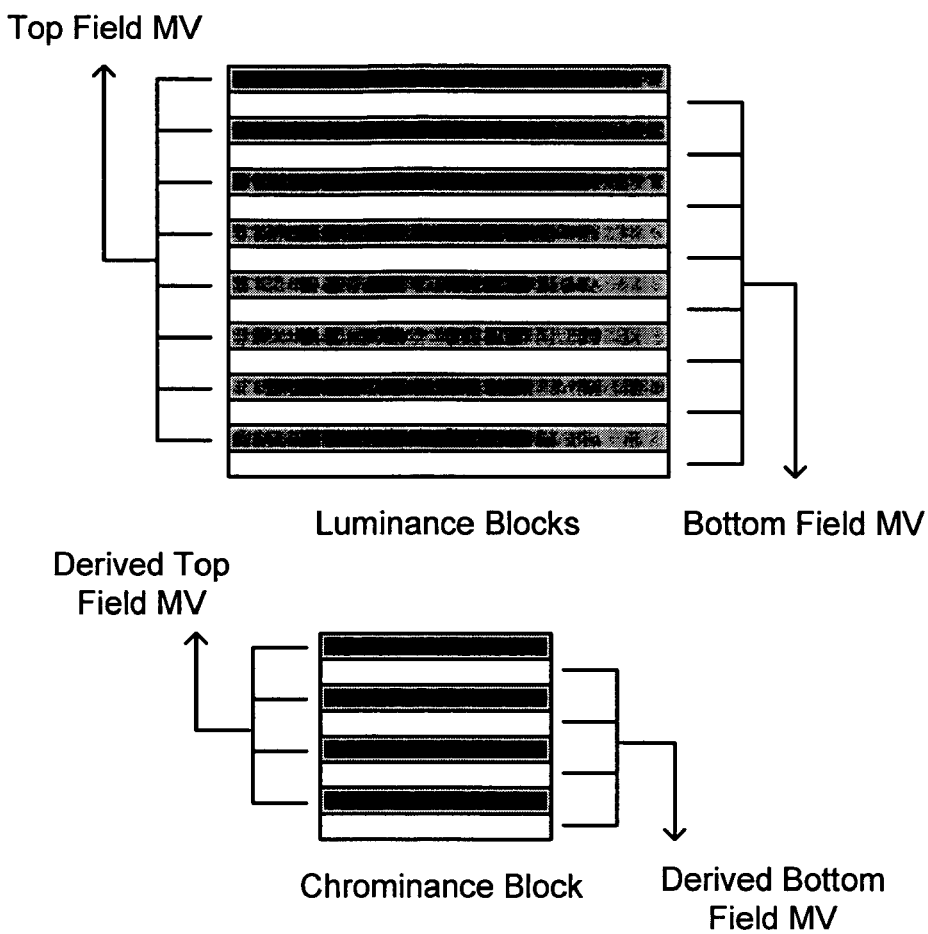
FIG. 23 is a diagram showing motion vectors for luminance blocks and derived motion vectors for chrominance blocks in a 2 field MV macroblock of an interlaced P-frame.

In a 2 Field MV macroblock, the displacement of each field for the 16×16 luminance component in the macroblock is described by a different motion vector. For example, FIG. 23 shows that a top field motion vector describes the displacement of the even lines of the luminance component and that a bottom field motion vector describes the displacement of the odd lines of the luminance component. Using the top field motion vector, an encoder can derive a corresponding top field chroma motion vector that describes the displacement of the even lines of the chroma blocks. Similarly, an encoder can derive a bottom field chroma motion vector that describes the displacements of the odd lines of the chroma blocks.

Figure 24:
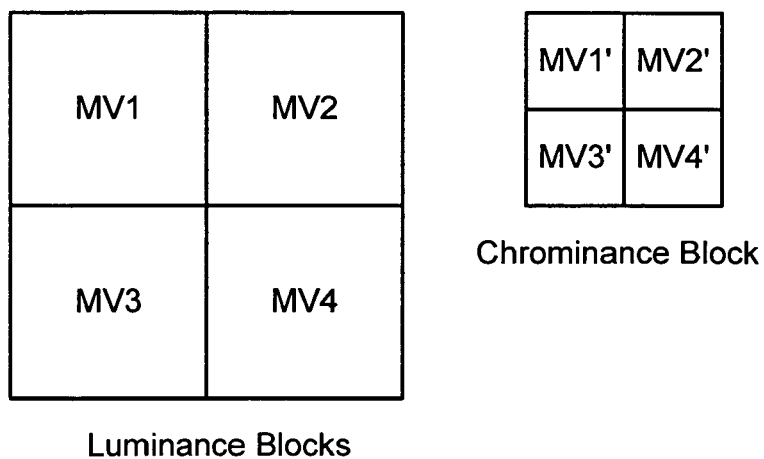
FIG. 24 is a diagram showing different motion vectors for each of four luminance blocks, and derived motion vectors for each of four chrominance sub-blocks, in a 4 frame MV macroblock of an interlaced P-frame.

Referring to FIG. 24, in a 4 Frame MV macroblock, the displacement of each of the four luminance blocks is described by a different motion vector (MV1, MV2, MV3 and MV4). Each chroma block can be motion compensated by using four derived chroma motion vectors (MV1', MV2', MV3' and MV4') that describe the displacement of four 4×4 chroma sub-blocks. A motion vector for each 4×4 chroma sub-block can be derived from the motion vector for the spatially corresponding luminance block.

Figure 25:
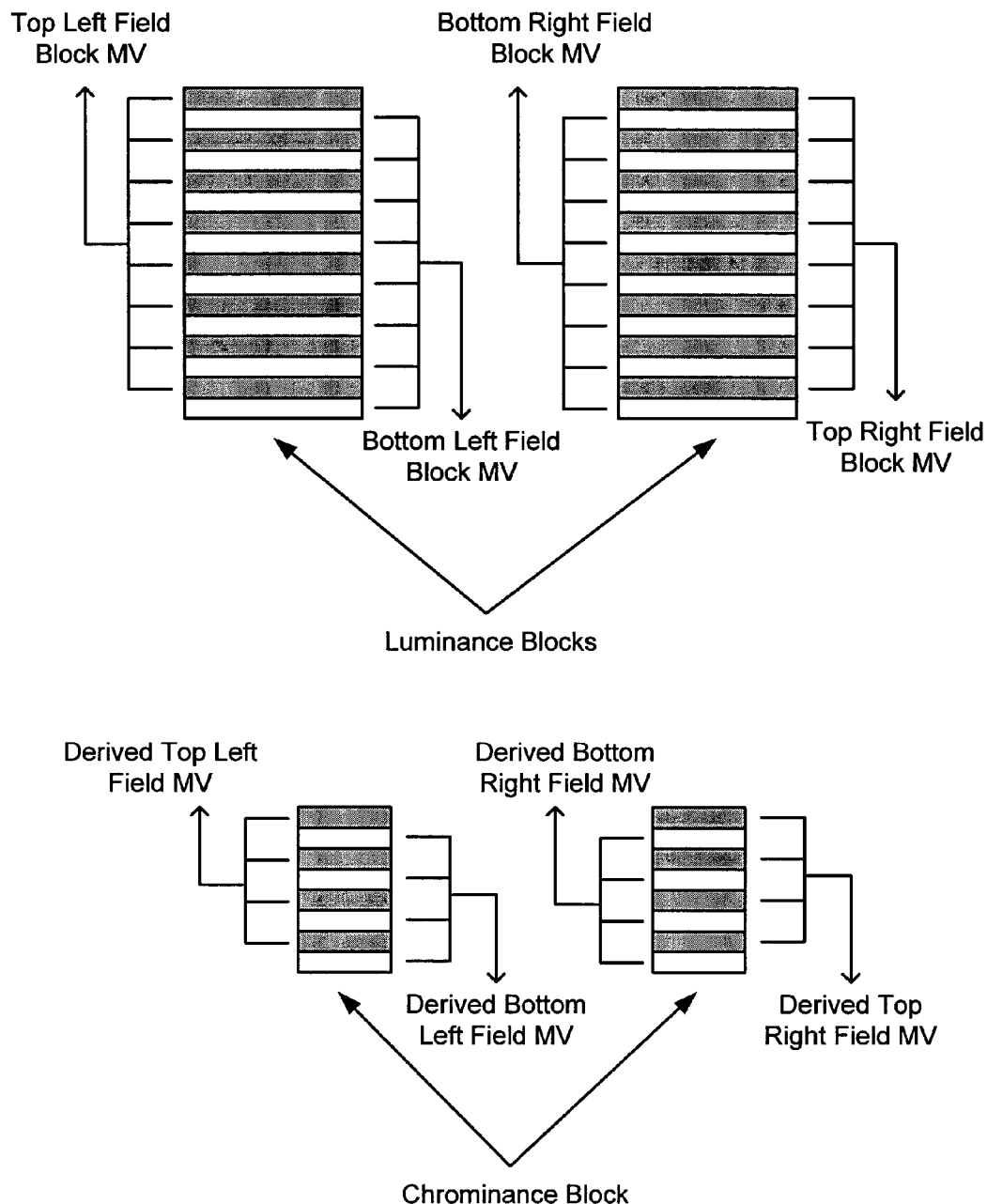
FIG. 25 is a diagram showing motion vectors for luminance blocks and derived motion vectors for chrominance blocks in a 4 field MV macroblock of an interlaced P-frame.

Referring to FIG. 25, in a 4 Field MV macroblock, the displacement of each field in the 16×16 luminance component is described by two different motion vectors. The lines of the luminance component are subdivided vertically to form two 8×16 regions each comprised of an 8×8 region of even lines interleaved with an 8×8 region of odd lines. For the even lines, the displacement of the left 8×8 region is described by the top left field block motion vector and the displacement of the right 8×8 region is described by the top right field block motion vector. For the odd lines, the displacement of the left 8×8 region is described by the bottom left field block motion vector and the displacement of the right 8×8 region is described by the bottom right field block motion vector. Each chroma block also can be partitioned into four regions and each chroma block region can be motion compensated using a derived motion vector.

For Intra macroblocks, motion is assumed to be zero.

B. Computing Motion Vector Predictors in Interlaced P-Frames

In general, the process of computing the motion vector predictor(s) for a current macroblock in an interlaced P-frame consists of two steps. First, three candidate motion vectors for the current macroblock are gathered from its neighboring macroblocks. For example, in one implementation, candidate motion vectors are gathered based on the arrangement shown in FIGS. 26A-26B (and various special cases for top row macroblocks, etc.). Alternatively, candidate motion vectors can be gathered in some other order or arrangement. Second, the motion vector predictor(s) for the current macroblock is computed from the set of candidate motion vectors. For example, the predictor can be computed using median-of-3 prediction, or by some other method.

IV. Innovations in Derivation of Chroma Motion Vectors

Described embodiments include techniques and tools for deriving chrominance (or "chroma") motion vectors from luminance (or "luma") motion vectors. Some of the described techniques and tools relate to deriving chroma motion vectors in frame-coded interlaced pictures (e.g., interlaced P-frames, interlaced B-frames, etc.) and improve the rate/distortion performance of interlace frame coded pictures. In described techniques and tools, chroma motion vectors are not sent explicitly in the bitstream. Rather, they are derived from the luma motion vectors that are encoded and sent for macroblocks or blocks of a frame.

Described embodiments implement one or more of the described techniques and tools including, but not limited to, the following:
1. An encoder/decoder obtains a one-to-one correspondence between luma and chroma motion vectors in interlace frame coded pictures (e.g., interlaced P-frames, interlaced B-frames, etc.) by deriving a chroma motion vector for each luma motion vector in a macroblock. The chroma motion vectors are then used to motion compensate the respective chroma block or field.
2. An encoder/decoder maintains coherence between the luma and chroma motion vector when the corresponding macroblock is field coded by adding a variable offset (e.g., using a lookup table) to the chroma motion vector after sub-sampling.

Although described techniques apply to a 4:2:0 macroblock format in interlaced video, described techniques can be applied to other macroblock formats (e.g., 4:2:2, 4:4:4, etc.) and other kinds of video. The described techniques and tools can be used in combination with one another or with other techniques and tools, or can be used independently.

A. One-to-One Chroma Motion Vector Correspondence

In some implementations, an encoder/decoder derives and uses the same number of chroma motion vectors to predict a macroblock as the number of luma motion vectors used to predict the macroblock. For example, when an encoder/decoder uses one, two or four luma field- or frame-type motion vectors for a given macroblock, the encoder/decoder derives one, two or four chroma motion vectors for the given macroblock, respectively. Such a technique differs from previous encoders and decoders (e.g., in a progressive frame or interlaced P-field context) in which the previous encoder or decoder always derives a single chroma motion vector for any number of luma motion vectors (e.g., one or four) in each macroblock.

Figure 27:
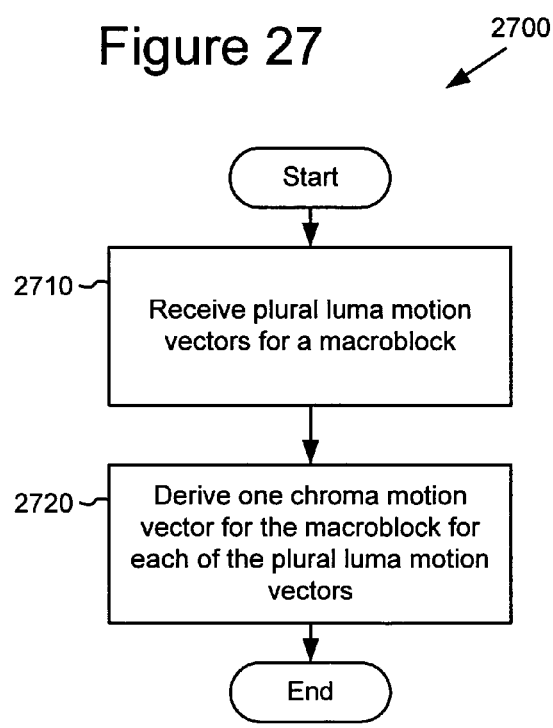
FIG. 27 is a flow chart showing a technique for deriving one chroma motion vector for each of the plural luma motion vectors.

FIG. 27 is a flow chart showing a technique 2700 for deriving a chroma motion vector for each of plural luma motion vectors in a macroblock. At 2710, an encoder/decoder receives plural luma motion vectors for the macroblock. At 2720, the encoder/decoder derives a chroma motion vector for each of the plural luma motion vectors. The number of derived chroma motion vectors varies depending on the number of luma motion vectors used to predict the current macroblock.

In some implementations, an encoder/decoder derives one chroma motion vector for a 1MV macroblock, two field chroma motion vectors for a 2 Field MV macroblock, four frame chroma motion vectors for a 4 Frame MV macroblock, and four field chroma motion vectors for a 4 Field MV macroblock.

For example, referring to again to FIGS. 23-25, FIG. 23 shows corresponding top and bottom field chroma motion vectors derived from luma motion vectors in a 2 Field MV macroblock. The derived top and bottom field chroma motion vectors describe the displacement of the even and odd lines, respectively, of the chroma blocks.

FIG. 24 shows corresponding frame chroma motion vectors (MV1', MV2', MV3' and MV4') derived from frame luma motion vectors for each of four blocks in a 4 Frame MV macroblock. The four derived chroma motion vectors describe the respective displacements of the four 4×4 chroma sub-blocks.

FIG. 25 shows corresponding field chroma motion vectors derived from field luma motion vectors in a 4 Field MV macroblock. Two field chroma motion vectors describe the displacement of each field in the chroma blocks. The lines of the chroma block is subdivided vertically to form two 4×8 regions each having a 4×4 region of top field lines interleaved with a 4×4 region of bottom field lines. For the top field lines, the displacement of the left 4×4 region is described by the top left field chroma block motion vector and the displacement of the right 4×4 region is described by the top right field chroma block motion vector. For the bottom field lines, the displacement of the left 4×4 region is described by the bottom left field chroma block motion vector and the displacement of the right 4×4 region is described by the bottom right field chroma block motion vector.

Each of the chroma block regions can be motion compensated using a derived motion vector. This allows greater resolution in chroma motion compensation than in previous encoders and decoder which derive a single chroma motion vector from any number of luma motion vectors (e.g., where one chroma motion vector is derived from four luma motion vectors in a macroblock), typically by sub-sampling (also known as "down-sampling") and/or averaging.

Alternatively, the encoder/decoder can derive chroma motion vectors from different numbers and/or types of luma motion vectors (e.g., two frame chroma motion vectors from a macroblock encoded with two frame luma motion vectors, more than four chroma motion vectors from a macroblock encoded with more than four luma motion vectors, etc.). Or, the chroma motion vectors can be derived in some other way while maintaining a 1:1 correspondence with the number of luma motion vectors for the macroblock.

B. Field-based Rounding in Field-coded Macroblocks

In some implementations, an encoder/decoder uses field-based rounding to maintain coherence between luma motion vectors and a chroma motion vectors during chroma motion vector derivation for field-coded macroblocks.

Given a luma frame motion vector or field motion vector, an encoder/decoder derives a corresponding chroma frame motion vector or field motion vector to perform motion compensation for a portion (and potentially all) of the chroma (Cb/Cr) block. In some implementations, chroma motion vector derivation for interlace frame coded pictures (e.g., interlaced P-frames, interlaced B-frames, etc.) comprises rounding and sub-sampling. For example, when deriving chroma motion vectors from luma field motion vectors, the encoder/decoder adds a variable offset (e.g., using a lookup table) to the chroma motion vector after sub-sampling.

FIG. 28 is a flow chart showing a technique 2800 for using a field-based rounding lookup table to derive a chroma motion vector in a macroblock. At 2810, an encoder/decoder sub-samples a luma field motion vector component (e.g., by dividing the y-component value by two in a 4:2:0 macroblock format). At 2820, the encoder/decoder then performs rounding using a field-based rounding lookup table.

The pseudocode 2900 in FIG. 29 describes how a chroma motion vector component ($CMV_x$, $CMV_y$) is derived from a luma motion vector component ($LMV_x$, $LMV_y$) in a 4:2:0 macroblock in one implementation. As shown in the pseudocode 2900, the encoder/decoder uses a simple rounding strategy (using rounding lookup table s_RndTbl[ ]) to round up the ¾-pel positions of the x-component of the motion vector prior to horizontal sub-sampling. The encoder/decoder uses the same rounding lookup table prior to vertical sub-sampling for the y-component if the macroblock is frame-coded. However, if the macroblock is field-coded, the encoder/decoder treats the y-component of the chroma motion vector differently. In a field-coded macroblock, a chroma motion vector corresponds to the top or bottom field. The top and bottom fields each comprise alternating horizontal lines of the chroma block. Therefore, in this case the encoder/decoder uses the field-based rounding lookup table s_RndTblField[ ] shown in the pseudocode 2900. A field-based rounding lookup table allows the encoder/decoder to maintain correct field offsets while rounding, so that the luma and chroma motion vectors map to consistent field offsets. For example, referring to FIG. 30, the values 0, 0, 1, 2 and 2, 2, 3, 8 (top field values 3010 in FIG. 30) in s_RndTblField[ ] apply to one field (e.g., the top field), and the values 4, 4, 5, 6 and 6, 6, 7, 12 (bottom field values 3020 in FIG. 30) apply to the other field (e.g., the bottom field) in the macroblock.

Alternatively, an encoder/decoder can use a different field-based rounding lookup table or perform rounding and/or sub-sampling in some other way. For example, an encoder/decoder processing macroblocks in different formats could use different sub-sampling factors and/or lookup table values.

V. Combined Implementations

A detailed combined implementation for a bitstream syntax, semantics, and decoder are now described, in addition to an alternative combined implementation with minor differences from the main combined implementation.

A. Bitstream Syntax

In various combined implementations, data for interlaced P-frames is presented in the form of a bitstream having plural layers (e.g., sequence, entry point, frame, field, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Figure 31:
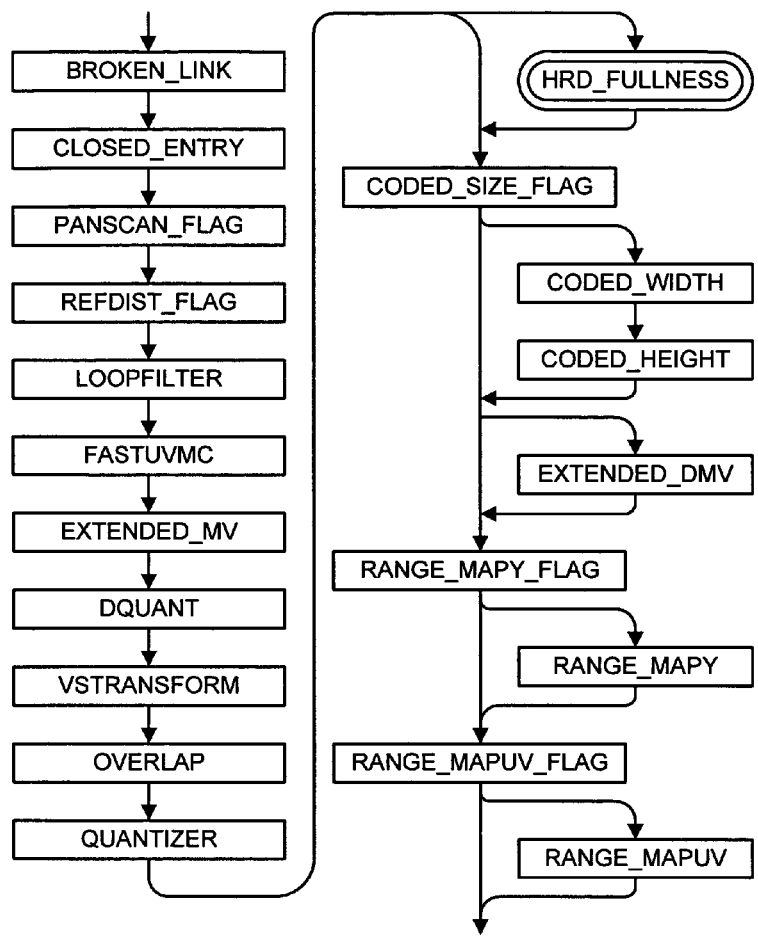
FIG. 31 is a diagram showing an entry-point-layer bitstream syntax in a combined implementation.

Entry-point-level bitstream elements are shown in FIG. 31. In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools (e.g., in-loop deblocking filtering) for frames following an entry point).

Figure 32:
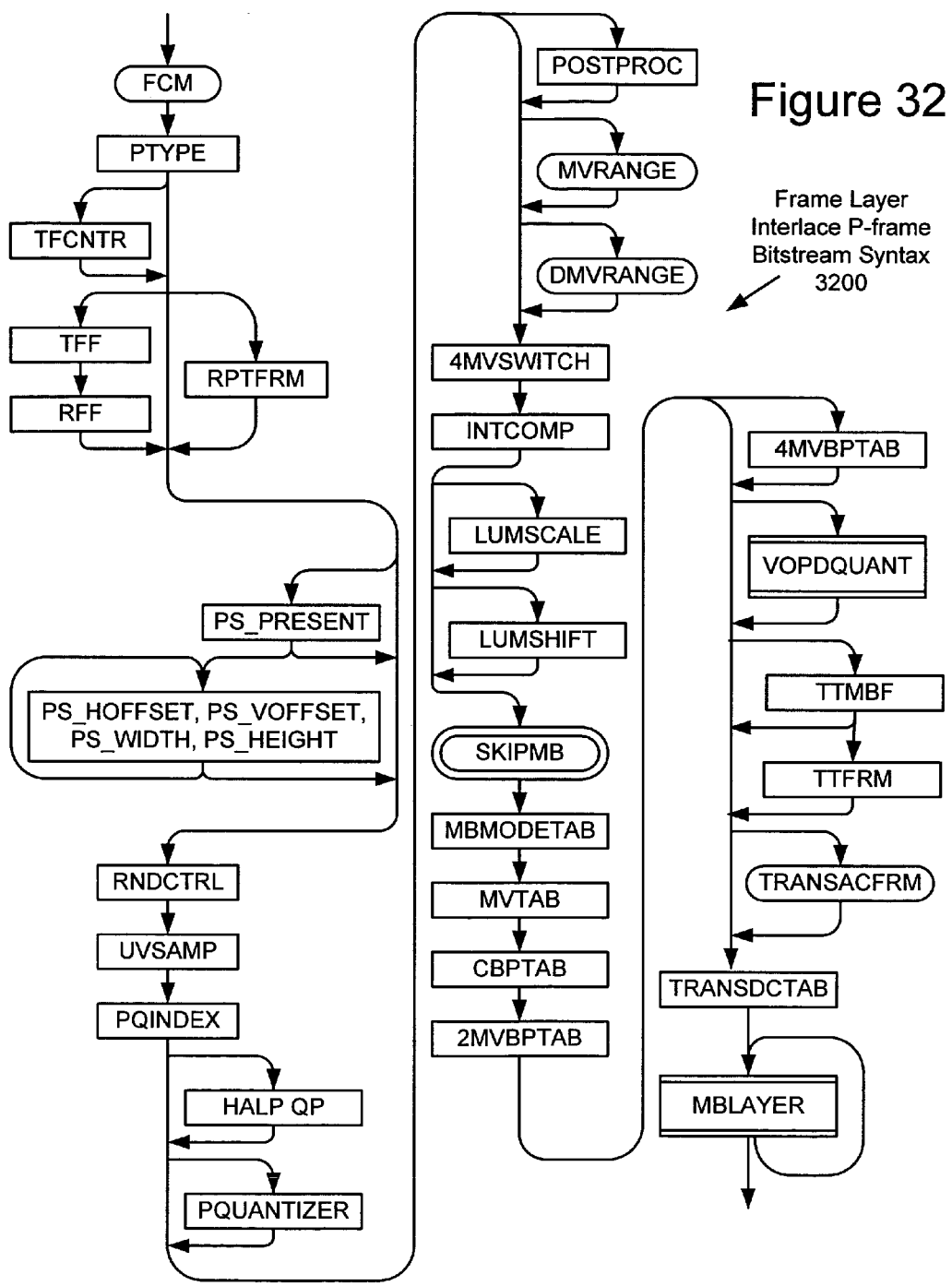
FIG. 32 is a diagram showing a frame-layer bitstream syntax for interlaced P-frames in a combined implementation.
Figure 33:
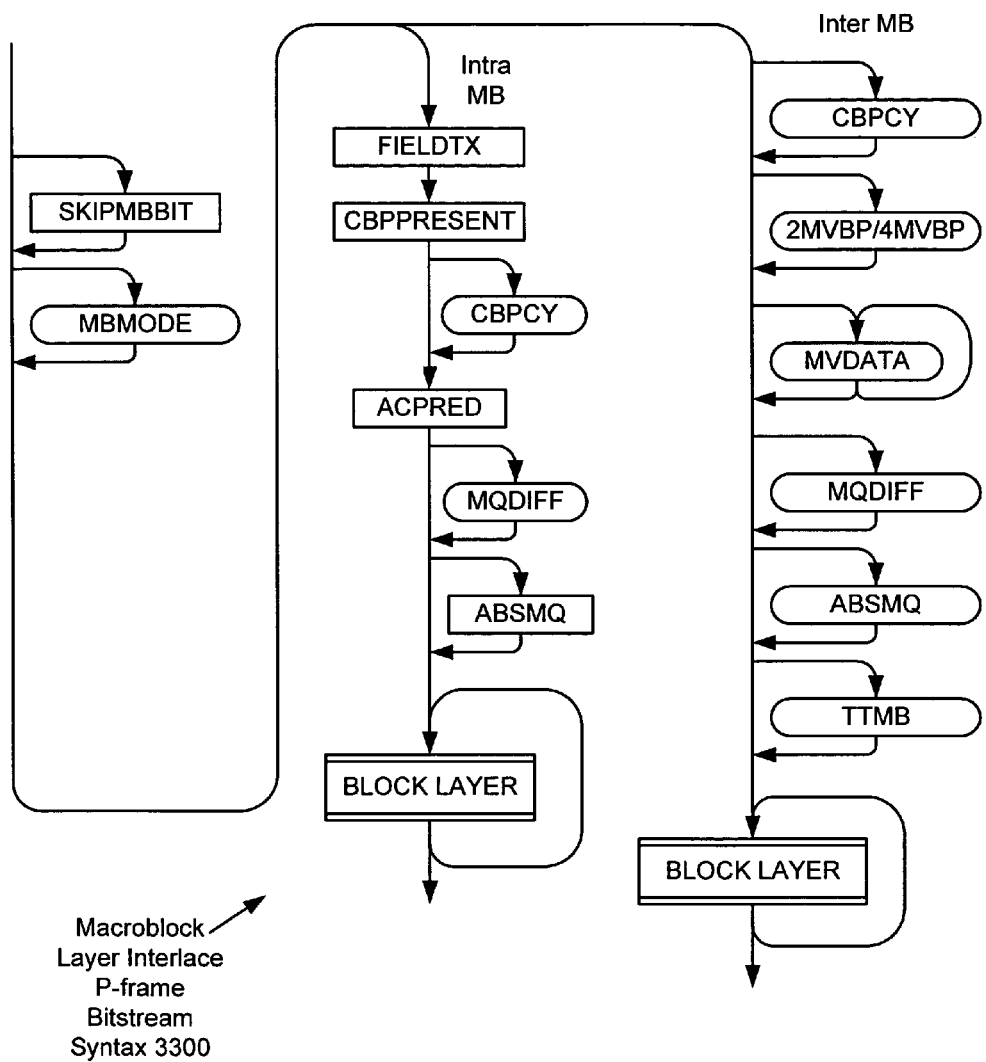
FIG. 33 is a diagram showing a macroblock-layer bitstream syntax for macroblocks of interlaced P-frames in a combined implementation.

For interlaced P-frames, frame-level bitstream elements are shown in FIG. 32. Data for each frame consists of a frame header followed by data for the macroblock layer. The bitstream elements that make up the macroblock layer for interlaced P-frames (whether for intra or various inter type macroblocks) are shown in FIG. 33.

The following sections describe selected bitstream elements in the frame and macroblock layers that are related to signaling for interlaced P-frames. Although the selected bitstream elements are described in the context of a particular layer, some bitstream elements can be used in more than one layer.

1. Selected Entry Point Layer Elements

Loop Filter (LOOPFILTER) (1 bit)

LOOPFILTER is a Boolean flag that indicates whether loop filtering is enabled for the entry point segment. If LOOPFILTER=0, then loop filtering is not enabled. If LOOPFILTER=1, then loop filtering is enabled. In an alternative combined implementation, LOOPFILTER is a sequence level element.

Extended Motion Vectors (EXTENDED_MV) (1 bit)

EXTENDED_MV is a 1-bit syntax element that indicates whether extended motion vectors is turned on (value 1) or off (value 0). EXTENDED_MV indicates the possibility of extended motion vectors (signaled at frame level with the syntax element MVRANGE) in P-frames and B-frames.

Extended Differential Motion Vector Range (EXTENDED_DMV)(1 bit)

EXTENDED_DMV is a 1-bit syntax element that is present if EXTENDED_MV=1. If EXTENDED_DMV is 1, extended differential motion vector range (DMVRANGE) shall be signaled at frame layer for the P-frames and B-frames within the entry point segment. If EXTENDED_DMV is 0, DMVRANGE shall not be signaled.

FAST UV Motion Comp (FASTUVMC) (1 bit)

FASTUVMC is a Boolean flag that controls the sub-pixel interpolation and rounding of chroma motion vectors. If FASTUVMC=1, the chroma motion vectors that are at quarter-pel offsets will be rounded to the nearest half or full-pel positions. If FASTUVMC=0, no special rounding or filtering is done for chroma. The FASTUVMC syntax element is ignored in interlaced P-frames and interlaced B-frames.

Variable Sized Transform (VSTRANSFORM) (1 bit)

VSTRANSFORM is a Boolean flag that indicates whether variable-sized transform coding is enabled for the sequence. If VSTRANSFORM=0, then variable-sized transform coding is not enabled. If VSTRANSFORM=1, then variable-sized transform coding is enabled.

2. Selected Frame Layer Elements

Frame Coding Mode (FCM) (Variable Size)

FCM is a variable length codeword ["VLC"] used to indicate the picture coding type. FCM takes on values for frame coding modes as shown in Table 1 below:

TABLE 1

Frame Coding Mode VLC

| FCM value | Frame Coding Mode |
| --- | --- |
| 0 | Progressive |
| 10 | Frame-Interlace |
| 11 | Field-Interlace |

Picture Type (PTYPE) (Variable Size)

PTYPE is a variable size syntax element present in the frame header for interlaced P-frames (or other kinds of interlaced frames such as interlaced B-frames and interlaced I-frames). PTYPE takes on values for different frame types according to Table 2 below.

TABLE 2

Picture Type VLC

| PTYPE VLC | Picture Type |
| --- | --- |
| 110 | I |
| 0 | P |
| 10 | B |
| 1110 | BI |
| 1111 | Skipped |

If PTYPE indicates that the frame is skipped then the frame is treated as a P-frame which is identical to its reference frame. The reconstruction of the skipped frame is equivalent conceptually to copying the reference frame. A skipped frame means that no further data is transmitted for this frame.

UV Sampling Format (UVSAMP) (1 bit)

UVSAMP is a 1-bit syntax element that is present when the sequence-level field INTERLACE=1. UVSAMP indicates the type of chroma sub-sampling used for the current frame. If UVSAMP=1, then progressive sub-sampling of the chroma is used, otherwise, interlace sub-sampling of the chroma is used. This syntax element does not affect decoding of the bitstream.

Extended MV Range (MVRANGE) (Variable Size)

MVRANGE is a variable-sized syntax element present when the entry-point-layer EXTENDED_MV bit is set to 1. The MVRANGE VLC represents a motion vector range.

Extended Differential MV Range (DMVRANGE) (Variable Size)

DMVRANGE is a variable-sized syntax element present if the entry-point-layer syntax element EXTENDED_DMV=1. The DMVRANGE VLC represents a motion vector differential range.

4 Motion Vector Switch (4MVSWITCH) (Variable Size or 1 bit)

For interlaced P-frames, the 4MVSWITCH syntax element is a 1-bit flag. If 4MVSWITCH is set to zero, the macroblocks in the picture have only one motion vector or two motion vectors, depending on whether the macroblock has been frame-coded or field-coded, respectively. If 4MVSWITCH is set to 1, there may be one, two or four motion vectors per macroblock.

Skipped Macroblock Decoding (SKIPMB) (Variable Size)

For interlaced P-frames, the SKIPMB syntax element is a compressed bitplane containing information that indicates the skipped/not-skipped status of each macroblock in the picture. The decoded bitplane represents the skipped/not-skipped status for each macroblock with 1-bit values. A value of 0 indicates that the macroblock is not skipped. A value of 1 indicates that the macroblock is coded as skipped. A skipped status for a macroblock in interlaced P-frames means that the decoder treats the macroblock as 1MV with a motion vector differential of zero and a coded block pattern of zero. No other information is expected to follow for a skipped macroblock.

Macroblock Mode Table (MBMODETAB) (2 or 3 bits)

The MBMODETAB syntax element is a fixed-length field. For interlaced P-frames, MBMODETAB is a 2-bit value that indicates which one of four code tables is used to decode the macroblock mode syntax element (MBMODE) in the macroblock layer. There are two sets of four code tables and the set that is being used depends on whether 4MV is used or not, as indicated by the 4MVSWITCH flag.

Motion Vector Table (MVTAB) (2 or 3 bits)

The MVTAB syntax element is a fixed length field. For interlaced P-frames, MVTAB is a 2-bit syntax element that indicates which of the four progressive (or, one-reference) motion vector code tables are used to code the MVDATA syntax element in the macroblock layer.

2MV Block Pattern Table (2MVBPTAB) (2 bits)

The 2MVBPTAB syntax element is a 2-bit value that signals which of four code tables is used to decode the 2MV block pattern (2MVBP) syntax element in 2 Field MV macroblocks.

4MV Block Pattern Table (4MVBPTAB) (2 bits)

The 4MVBPTAB syntax element is a 2-bit value that signals which of four code tables is used to decode the 4MV block pattern (4MVBP) syntax element in 4MV macroblocks. For interlaced P-frames, it is present if the 4MVSWITCH syntax element is set to 1.

Macroblock-level Transform Type Flag (TTMBF) (1 bit)

This syntax element is present in P-frames and B-frames if the sequence-level syntax element VSTRANSFORM=1. TTMBF is a one-bit syntax element that signals whether transform type coding is enabled at the frame or macroblock level. If TTMBF=1, the same transform type is used for all blocks in the frame. In this case, the transform type is signaled in the Frame-level Transform Type (TTFRM) syntax element that follows. If TTMBF=0, the transform type may vary throughout the frame and is signaled at the macroblock or block levels.

Frame-Level Transform Type (TTFRM) (2 bits)

This syntax element is present in P-frames and B-frames if VSTRANSFORM=1 and TTMBF=1. TTFRM signals the transform type used to transform the 8×8 pixel error signal in predicted blocks. The 8×8 error blocks may be transformed using an 8×8 transform, two 8×4 transforms, two 4×8 transforms or four 4×4 transforms.

3. Selected Macroblock Layer Elements

FIG. 33 is a diagram showing a macroblock-level bitstream syntax for macroblocks interlaced P-frames in the combined implementation. Specific bitstream elements are described below. Data for a macroblock consists of a macroblock header followed by block layer data. Bitstream elements in the macroblock layer for interlaced P-frames may potentially be present for macroblocks in other interlaced pictures.

Skip MB Bit (SKIPMBBIT)(1 bit)

SKIPMBBIT is a 1-bit syntax element present in interlaced P-frame macroblocks and interlaced B-frame macroblocks if the frame-level syntax element SKIPMB indicates that raw mode is used. If SKIPMBBIT=1, the macroblock is skipped.

Macroblock Mode (MBMODE) (Variable Size)

MBMODE is a variable-size syntax element that jointly specifies macroblock type (e.g., 1MV, 2 Field MV, 4 Field MV, 4 Frame MV or Intra), field/frame coding type (e.g., field, frame, or no coded blocks), and the presence of differential motion vector data for 1MV macroblocks. MBMODE is explained in detail below.

2MV Block Pattern (2MVBP) (Variable Size)

2MVBP is a variable-sized syntax element present in interlaced P-frame and interlaced B-frame macroblocks. In interlaced P-frame macroblocks, 2MVBP is present if MBMODE indicates that the macroblock has two field motion vectors. In this case, 2MVBP indicates which of the two luma blocks contain non-zero motion vector differentials.

4MV Block Pattern (4MVBP) (Variable Size)

4MVBP is a variable-sized syntax element present in interlaced P-field, interlaced B-field, interlaced P-frame and interlaced B-frame macroblocks. In interlaced P-frame, 4MVBP is present if MBMODE indicates that the macroblock has four motion vectors. In this case, 4MVBP indicates which of the four luma blocks contain non-zero motion vector differentials.

Field Transform Flag (FIELDTX) (1 bit)

FIELDTX is a 1-bit syntax present in interlaced B-frame intra-coded macroblocks. This syntax element indicates whether a macroblock is frame or field coded (basically, the internal organization of the macroblock). FIELDTX=1 indicates that the macroblock is field-coded. Otherwise, the macroblock is frame-coded. In inter-coded macroblocks, this syntax element can be inferred from MBMODE as explained in detail below.

CBP Present Flag (CBPPRESENT) (1 bit)

CBPPRESENT is a 1-bit syntax present in intra-coded macroblocks in interlaced P-frames and interlaced B-frames. If CBPPRESENT is 1, the CBPCY syntax element is present for that macroblock and is decoded. If CBPPRESENT is 0, the CBPCY syntax element is not present and shall be set to zero.

Coded Block Pattern (CBPCY) (Variable Size)

CBPCY is a variable-length syntax element indicates the transform coefficient status for each block in the macroblock. CBPCY decodes to a 6-bit field which indicates whether coefficients are present for the corresponding block. For intra-coded macroblocks, a value of 0 in a particular bit position indicates that the corresponding block does not contain any non-zero AC coefficients. A value of 1 indicates that at least one non-zero AC coefficient is present. The DC coefficient is still present for each block in all cases. For inter-coded macroblocks, a value of 0 in a particular bit position indicates that the corresponding block does not contain any non-zero coefficients. A value of 1 indicates that at least one non-zero coefficient is present. For cases where the bit is 0, no data is encoded for that block.

Motion Vector Data (MVDATA) (Variable Size)

MVDATA is a variable sized syntax element that encodes differentials for the motion vector(s) for the macroblock, the decoding of which is described in detail in below.

MB-Level Transform Type (TTMB) (Variable Size)

TTMB is a variable-size syntax element in P-picture and B-picture macroblocks when the picture layer syntax element TTMBF=0. TTMB specifies a transform type, transform type signal level, and subblock pattern.

B. Decoding Interlaced P-Frames

A process for decoding interlaced P-frames in a combined implementation is described below.

1. Macroblock Layer Decoding of Interlaced P-Frames

In an interlaced P-frame, each macroblock may be motion compensated in frame mode using one or four motion vectors or in field mode using two or four motion vectors. A macroblock that is inter-coded does not contain any intra blocks. In addition, the residual after motion compensation may be coded in frame transform mode or field transform mode. More specifically, the luma component of the residual is re-arranged according to fields if it is coded in field transform mode but remains unchanged in frame transform mode, while the chroma component remains the same. A macroblock may also be coded as intra.

Motion compensation may be restricted to not include four (both field/frame) motion vectors, and this is signaled through 4MVSWITCH. The type of motion compensation and residual coding is jointly indicated for each macroblock through MBMODE and SKIPMB. MBMODE employs a different set of tables according to 4MVSWITCH.

Macroblocks in interlaced P-frames are classified into five types: 1MV, 2 Field MV, 4 Frame MV, 4 Field MV, and Intra. These five types are described in further detail in above in Section III. The first four types of macroblock are inter-coded while the last type indicates that the macroblock is intra-coded. The macroblock type is signaled by the MBMODE syntax element in the macroblock layer along with the skip bit. (A skip condition for the macroblock also can be signaled at frame level in a compressed bit plane.) MBMODE jointly encodes macroblock types along with various pieces of information regarding the macroblock for different types of macroblock.

Skipped Macroblock Signaling

The macroblock-level SKIPMBBIT field indicates the skip condition for a macroblock. If the SKIPMBBIT field is 1, then the current macroblock is said to be skipped and there is no other information sent after the SKIPMBBIT field. (At frame level, the SKIPMB field indicates the presence of SKIPMBBIT at macroblock level (in raw mode) or stores skip information in a compressed bit plane. The decoded bitplane contains one bit per macroblock and indicates the skip condition for each respective macroblock.) The skip condition implies that the current macroblock is 1MV with zero differential motion vector (i.e. the macroblock is motion compensated using its 1MV motion predictor) and there are no coded blocks (CBP=0).

On the other hand, if the SKIPMB field is not 1, the MBMODE field is decoded to indicate the type of macroblock and other information regarding the current macroblock, such as information described in the following section.

Macroblock Mode Signaling

MBMODE jointly specifies the type of macroblock (1MV, 4 Frame MV, 2 Field MV, 4 Field MV, or intra), types of transform for inter-coded macroblock (i.e. field or frame or no coded blocks), and whether there is a differential motion vector for a 1MV macroblock. MBMODE can take one of 15 possible values:

Let <MVP> denote the signaling of whether a nonzero 1MV differential motion vector is present or absent. Let <Field/Frame transform> denote the signaling of whether the residual of the macroblock is (1) frame transform coded; (2) field transform coded; or (3) zero coded blocks (i.e. CBP=0). MBMODE signals the following information jointly:

MBMODE = {<1MV, MVP, Field/Frame transform>, <2 Field MV, Field/Frame transform>, <4 Frame MV, Field/Frame transform>, <4 Filed MV, Field/Frame transform>, <INTRA>};

The case <1MV, MVP=0, CBP=0>, is not signaled by MBMODE, but is signaled by the skip condition.

For inter-coded macroblocks, the CBPCY syntax element is not decoded when <Field/frame Transform> in MBMODE indicates no coded blocks. On the other hand, if <Field/frame Transform> in MBMODE indicates field or frame transform, then CBPCY is decoded. The decoded <Field/frame Transform> is used to set the flag FIELDTX. If it indicates that the macroblock is field transform coded, FIELDTX is set to 1. If it indicates that the macroblock is frame transform coded, FIELDTX is set to 0. If it indicates a zero-coded block, FIELDTX is set to the same type as the motion vector, i.e., FIELDTX is set to 1 if it is a field motion vector and to 0 if it is a frame motion vector.

For non-1MV inter-coded macroblocks, an additional field is sent to indicate which of the differential motion vectors is non-zero. In the case of 2 Field MV macroblocks, the 2MVBP field is sent to indicate which of the two motion vectors contain nonzero differential motion vectors. Similarly, the 4MVBP field is sent to indicate which of the four motion vectors contain nonzero differential motion vectors.

For intra-coded macroblocks, the Field/Frame transform and zero coded blocks are coded in separate fields.

2. Motion Vector Decoding for Interlaced P-Frames

Motion Vector Predictors for Interlaced P-Frames

Figure 26A:
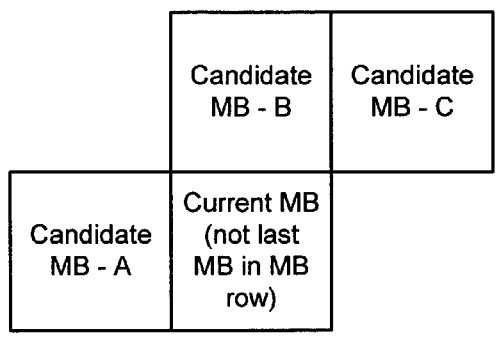
FIGS. 26A-26B are diagrams showing candidate predictors for a current macroblock of an interlaced P-frame.
Figure 26B:
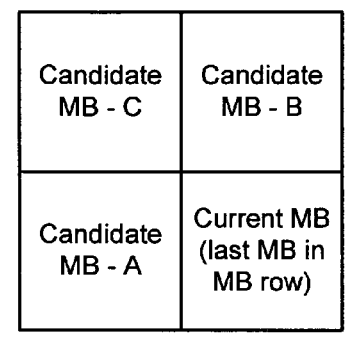

The process of computing the motion vector predictor(s) for the current macroblock consists of two steps. First, three candidate motion vectors for the current macroblock are gathered from its neighboring macroblocks. Second, the motion vector predictor(s) for the current macroblock is computed from the set of candidate motion vectors. FIGS. 26A-26B show neighboring macroblocks from which the candidate motion vectors are gathered. The order of the collection of candidate motion vectors is important. In this combined implementation, the order of collection always starts at A, proceeds to B, and ends at C. A predictor candidate is considered to be non-existent if the corresponding block is outside the frame boundary or if the corresponding block is part of a different slice. Thus, motion vector prediction is not performed across slice boundaries.

The following sections describe how the candidate motion vectors are collected for different types of macroblocks and how the motion vector predictors are computed.

1MV Candidate Motion Vectors

In this combined implementation, the pseudo-code 3400 in FIG. 34 is used to collect the up to three candidate motion vectors for the motion vector.

4 Frame MV Candidate Motion Vectors

For 4 Frame MV macroblocks, for each of the four frame block motion vectors in the current macroblock, the candidate motion vectors from the neighboring blocks are collected. In this combined implementation, the pseudo-code 3500 in FIG. 35 is used to collect the up to three candidate motion vectors for the top left frame block motion vector. The pseudo-code 3600 in FIG. 36 is used to collect the up to three candidate motion vectors for the top right frame block motion vector. The pseudo-code 3700 in FIG. 37 is used to collect the up to three candidate motion vectors for the bottom left frame block motion vector. The pseudo-code 3800 in FIG. 38 is used to collect the up to three candidate motion vectors for the bottom right frame block motion vector.

2 Field MV Candidate Motion Vectors

For 2 Field MV macroblocks, for each of the two field motion vectors in the current macroblock, the candidate motion vectors from the neighboring blocks are collected. The pseudo-code 3900 in FIG. 39 is used to collect the up to three candidate motion vectors for the top field motion vector. The pseudo-code 4000 in FIG. 40 is used to collect the up to three candidate motion vectors for the bottom field motion vector.

4 Field MV Candidate Motion Vectors

For 4 Field MV macroblocks, for each of the four field blocks in the current macroblock, the candidate motion vectors from the neighboring blocks are collected. The pseudo-code 4100 in FIG. 41 is used to collect the up to three candidate motion vectors for the top left field block motion vector. The pseudo-code 4200 in FIG. 42 is used to collect the up to three candidate motion vectors for the top right field block motion vector. The pseudo-code 4300 in FIG. 43 is used to collect the up to three candidate motion vectors for the bottom left field block motion vector. The pseudo-code 4400 in FIG. 44 is used to collect the up to three candidate motion vectors for the bottom right field block motion vector.

Average Field Motion Vectors

Given two field motion vectors ($MVX_1$, $MVY_1$) and ($MVX_2$, $MVY_2$), the average operation used to form a candidate motion vector ($MVX_A$, $MVY_A$) is:

$$MVX_A = (MVX_1 + MVX_2 + 1) >> 1;$$

$$MVY_A = (MVY_1 + MVY_2 + 1) >> 1;$$

Computing Frame MV Predictors from Candidate Motion Vectors

This section describes how motion vector predictors are calculated for frame motion vectors given a set of candidate motion vectors. In this combined implementation, the operation is the same for computing the predictor for 1MV or for each one of the four frame block motion vectors in 4 Frame MV macroblocks.

The pseudo-code 4500 in FIG. 45 describes how the motion vector predictor ($PMV_x$, $PMV_y$) is computed for frame motion vectors. In the pseudo-code 4500, TotalValidMV denotes the total number of motion vectors in the set of candidate motion vectors (TotalValidMV=0, 1, 2, or 3), and the ValidMV array denotes the motion vector in the set of candidate motion vectors.

Computing Field MV Predictors from Candidate Motion Vectors

This section describes how motion vector predictors are computed for field motion vectors given the set of candidate motion vectors. In this combined implementation, the operation is the same for computing the predictor for each of the two field motion vectors in 2 Field MV macroblocks or for each of the four field block motion vectors in 4 Field MV macroblocks.

First, the candidate motion vectors are separated into two sets, where one set contains only candidate motion vectors that point to the same field as the current field and the other set contains candidate motion vectors that point to the opposite field. Assuming that the candidate motion vectors are represented in quarter pixel units, the following check on its y-component verifies whether a candidate motion vector points to the same field:

```
if (ValidMV_y & 4) {
    ValidMV points to the opposite field.
} else {
    ValidMV points to the same field.
}
```

The pseudo-code 4600 in FIG. 46 describes how the motion vector predictor ($PMV_x$, $PMV_y$) is computed for field motion vectors. In the pseudo-code 4600, SameFieldMV and OppFieldMV denote the two sets of candidate motion vectors and NumSameFieldMV and NumOppFieldMV denote the number of candidate motion vectors that belong to each set. The order of candidate motion vectors in each set starts with candidate A if it exists, followed by candidate B if it exists, and then candidate C if it exists. For example, if the set SameFieldMV contains only candidate B and candidate C, then SameFieldMV[0] is candidate B.

Decoding Motion Vector Differentials

The MVDATA syntax elements contain motion vector differential information for the macroblock. Depending on the type of motion compensation and motion vector block pattern signaled at each macroblock, there may be from zero to four MVDATA syntax elements per macroblock. More specifically, For 1MV macroblocks, there may be either zero or one MVDATA syntax element present depending on the MVP field in MBMODE.

For 2 Field MV macroblocks, there may be either zero, one, or two MVDATA syntax element(s) present depending on 2MVBP.

For 4 Frame/Field MV macroblocks, there may be either zero, one, two, three, or four MVDATA syntax element(s) present depending on 4MVBP.

In this combined implementation, the motion vector differential is decoded in the same way as a one reference field motion vector differential for interlaced P-fields, without a half-pel mode. (The pseudo-code 4700 in FIG. 47A illustrates how the motion vector differential is decoded for a one-reference field. The pseudo-code 4710 in FIG. 47B illustrates how the motion vector differential is decoded for a one-reference field in an alternative combined implementation. Pseudo-code 4710 decodes motion vector differentials in a different way. For example, pseudo-code 4710 omits handling of extended motion vector differential ranges.)

Reconstructing Motion Vectors

Given the motion vector differential dmv, the luma motion vector is reconstructed by adding the differential to the predictor as follows:

$$mv\_x = (dmv\_x + predictor\_x) \text{ smod } range\_x$$

$$mv\_y = (dmv\_y + predictor\_y) \text{ smod } range\_y$$

The smod operation ensures that the reconstructed vectors are valid. (A smod b) lies within −b and b−1. range_x and range_y depend on MVRANGE.

Given a luma frame or field motion vector, a corresponding chroma frame or field motion vector is derived to compensate a portion (or potentially all) of the chroma ($C_b/C_r$) block. The FASTUVMC syntax element is ignored in interlaced P-frames and interlaced B-frames. The pseudo-code 2900 in FIG. 29 describes how a chroma motion vector CMV is derived from a luma motion vector LMV in interlace P-frames.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a video encoder, a method comprising:
   encoding video data, wherein the encoding includes:
      receiving luma motion vector information for more than two luma motion vectors for one macroblock, each of the more than two luma motion vectors associated with at least part of the macroblock; and
      deriving a chroma motion vector associated with at least part of the macroblock for each of the more than two luma motion vectors, the deriving comprising performing at least one calculation involving a field-based rounding table on the luma motion vector information, wherein the at least one calculation comprises rounding at least a portion of the luma motion vector information using the field-based rounding table; and
   outputting the encoded video data in a bitstream.

2. The method of claim 1 wherein the macroblock is a field-coded macroblock.

3. The method of claim 1 wherein the macroblock is a field-coded macroblock having four luma field motion vectors, each of the four luma field motion vectors describing motion in part of a luma field of the macroblock.

4. The method of claim 3 wherein each chroma motion vector is a chroma field motion vector describing motion in a different part of a chroma field of the macroblock.

5. The method of claim 1 wherein the macroblock is a 4:2:0 macroblock.

6. The method of claim 1 wherein the deriving further comprises sub-sampling at least a portion of the luma motion vector information.

7. The method of claim 1 wherein the more than two luma motion vectors are in quarter-pixel units.

8. A computer-readable storage medium having computer-executable instructions stored thereon for performing the method of claim 1.

9. In a video decoder, a method comprising:
receiving luma motion vector information for one or more luma motion vectors, each of the one or more luma motion vectors associated with at least part of a macroblock in an interlaced P-frame; and
deriving a chroma motion vector associated with at least part of the macroblock for each of the one or more luma motion vectors, the deriving based at least in part on the motion vector information for the one or more luma motion vectors, wherein the deriving comprises applying a field-based rounding lookup table to at least a portion of the luma motion vector information;
wherein the video decoder is operable to decode macroblocks predicted using four luma field motion vectors in an interlaced P-frame.

10. The method of claim 9 wherein the decoder is further operable to decode inter-coded macroblocks having four luma frame motion vectors, inter-coded macroblocks having two luma field motion vectors, inter-coded macroblocks having one luma frame motion vector, and intra macroblocks.

11. The method of claim 9 wherein the deriving comprises deriving four chroma field motion vectors.

12. A computer-readable storage medium storing computer-executable instructions for causing a computer to perform a method comprising:
receiving luma motion vector information for one or more luma field motion vectors, each of the one or more luma field motion vectors associated with at least part of a macroblock in an interlaced frame coded picture; and
deriving a chroma motion vector associated with at least part of the macroblock for each of the one or more luma field motion vectors, the deriving based at least in part on the motion vector information for the one or more luma field motion vectors, the deriving the chroma motion vector comprising:
rounding a luma field motion vector component using a field-based rounding table; and
sub-sampling the luma field motion vector component.

13. The computer-readable storage medium of claim 12 wherein the interlaced frame coded picture is an interlaced P-frame.

14. The computer-readable storage medium of claim 12 wherein the field-based rounding table is an integer array consisting of the following set of values: {0, 0 , 1, 2, 4, 4, 5, 6, 2, 2, 3, 8, 6, 6, 7, 12}.

15. The computer-readable storage medium of claim 12 wherein the one or more luma field motion vectors comprises four luma field motion vectors.

16. The computer-readable storage medium method of claim 12 wherein the macroblock is a 4:2:0 macroblock, and wherein the sub-sampling comprises dividing the luma field motion vector component by two.

17. In a video decoder, a method of decoding encoded video data comprising:
receiving luma motion vector information for one or more luma field motion vectors, each of the one or more luma field motion vectors associated with at least part of a macroblock in an interlaced frame coded picture; and
deriving a chroma motion vector associated with at least part of the macroblock for each of the one or more luma field motion vectors, the deriving based at least in part on the motion vector information for the one or more luma field motion vectors, the deriving the chroma motion vector comprising:
rounding a luma field motion vector component using a field-based rounding table; and
sub-sampling the luma field motion vector component.

18. The method of claim 17 wherein the interlaced frame coded picture is an interlaced P-frame.

19. The method of claim 17 wherein the field-based rounding table is an integer array consisting of the following set of values: {0, 0, 1, 2, 4, 4, 5, 6, 2, 2, 3, 8, 6, 6, 7, 12}.

20. The method of claim 17 wherein the one or more luma field motion vectors comprises four luma field motion vectors.

21. The method of claim 17 wherein the macroblock is a 4:2:0 macroblock, and wherein the sub-sampling comprises dividing the luma field motion vector component by two.

22. In a video decoder, a method of decoding encoded video data comprising:
receiving luma motion vector information for one or more luma motion vectors, each of the one or more luma motion vectors associated with at least part of a macroblock in an interlaced frame coded picture; and
for each of the one or more luma motion vectors, deriving a chroma motion vector based at least in part on the luma motion vector information for the luma motion vector, wherein the deriving the chroma motion vector comprises:
rounding a horizontal component of the chroma motion vector using a first rounding table;
determining if the luma motion vector is a luma field motion vector;
if the luma motion vector is a luma field motion vector, rounding a vertical component of the chroma motion vector using a second rounding table different than the first rounding table, wherein the second rounding table is a field-based rounding table; and
otherwise, rounding the vertical component of the chroma motion vector using the first rounding table.

* * * * *